(12) United States Patent
Bikson

(10) Patent No.: US 12,139,681 B1
(45) Date of Patent: Nov. 12, 2024

(54) SYSTEM AND METHOD FOR PRODUCING RENEWABLE NATURAL GAS FROM BIOGAS

(71) Applicant: Unconventional Gas Solutions, LLC, Houston, TX (US)

(72) Inventor: Benjamin Bikson, Newton, MA (US)

(73) Assignee: Unconventional Gas Solutions, LLC, Houston, TX (US)

( * ) Notice: Subject to any disclaimer, the term of this patent is extended or adjusted under 35 U.S.C. 154(b) by 0 days.

(21) Appl. No.: 18/644,398

(22) Filed: Apr. 24, 2024

(51) Int. Cl.
| | |
|---|---|
| *B01D 53/22* | (2006.01) |
| *B01D 53/00* | (2006.01) |
| *B01D 53/04* | (2006.01) |
| *B01D 53/84* | (2006.01) |
| *C10L 3/10* | (2006.01) |

(52) U.S. Cl.
CPC .............. *C10L 3/103* (2013.01); *C10L 3/104* (2013.01); *C10L 3/105* (2013.01); *C10L 3/106* (2013.01); *C10L 2200/0469* (2013.01); *C10L 2290/08* (2013.01); *C10L 2290/30* (2013.01); *C10L 2290/542* (2013.01); *C10L 2290/548* (2013.01)

(58) Field of Classification Search
CPC .... B01D 53/22; B01D 53/229; B01D 53/047; B01D 53/84; B01D 53/002; B01D 53/226; B01D 2256/245; B01D 2257/504; B01D 2257/104; B01D 2257/102; B01D 2257/304; B01D 2259/40086; B01D 2258/05; B01D 2053/221; B01D 2259/402; C10L 3/104; C10L 3/105; C10L 3/103; C10L 2290/548
See application file for complete search history.

(56) References Cited

U.S. PATENT DOCUMENTS

| | | | |
|---|---|---|---|
| 5,401,300 A | 3/1995 | Lokhandwala et al. | |
| 6,630,011 B1 * | 10/2003 | Baker | B01D 53/225 95/47 |

(Continued)

FOREIGN PATENT DOCUMENTS

| | | |
|---|---|---|
| EP | 3446771 B1 | 3/2010 |
| WO | WO2022012944 A1 | 1/2022 |

OTHER PUBLICATIONS

Anjan K. Datta et al., "Optimization of membrane unit for removing carbon dioxide from natural gas"; Journal of Membrane Science 283 (2006) 291-300.

(Continued)

*Primary Examiner* — Youngsul Jeong
(74) *Attorney, Agent, or Firm* — FORGE IP, PLLC

(57) ABSTRACT

An improved method and apparatus for removing acid gases and other impurities from raw biogas streams, such as biogas from landfills or biogas from controlled anaerobic digestion, is disclosed. The method provides efficient generation of high-purity renewable natural gas from raw biogas. The biogas is treated in a multi-stage membrane system integrated with compression equipment. The membrane separation units are arranged into interconnected high-pressure and low-pressure gas recycling loops powered by high-pressure and low-pressure compressors. The combined system provides for the generation of efficient contaminant removal from raw biogas to generate high-purity methane products with reduced compression energy consumption.

43 Claims, 4 Drawing Sheets

(56) References Cited

U.S. PATENT DOCUMENTS

| | | | |
|---|---|---|---|
| 8,211,211 B1* | 7/2012 | Knaebel | B01D 53/75 95/122 |
| 8,999,038 B2* | 4/2015 | Ungerank | B01D 53/227 95/47 |
| 9,770,687 B2 | 9/2017 | Ungerank et al. | |
| 9,988,326 B2 | 6/2018 | Paget et al. | |
| 10,471,380 B2 | 11/2019 | Priske | |
| 10,569,217 B2 | 2/2020 | Mitariten | |
| 10,589,215 B2 | 3/2020 | Ding et al. | |
| 10,780,392 B2 | 9/2020 | Bikson et al. | |
| 11,498,026 B2 | 11/2022 | Wu et al. | |
| 2017/0283292 A1* | 10/2017 | Kim | B01D 53/226 |
| 2018/0250627 A1 | 9/2018 | Zick et al. | |
| 2019/0224617 A1* | 7/2019 | Mitariten | B01D 53/228 |
| 2020/0179868 A1 | 6/2020 | Ding | |
| 2022/0219978 A1* | 7/2022 | Tewari | C01B 3/56 |
| 2022/0297055 A1 | 9/2022 | Barraud | |

OTHER PUBLICATIONS

A. Makaruk et al. "Membrane biogas upgrading processes for the production of natural gas substitute"; Separation and Purification Technology 74 (2010) pp. 83-92.

M. Scholz et al. "Structural optimization of membrane-based biogas upgrading processes"; Journal of Membrane Science 474 (2015) 1-10.

* cited by examiner

SYSTEM AND METHOD FOR PRODUCING RENEWABLE NATURAL GAS FROM BIOGAS

FIELD OF THE INVENTION

This invention relates to a system and method for removing impurities from a range of biogas streams by a multi-stage membrane gas separation process integrated with compression equipment.

BACKGROUND OF THE INVENTION

Methane is one of the main components of the primary energy sources used in the world. Much of the raw methane-containing gas sources are "subquality," that is, the raw gas exceeds pipeline specifications in nitrogen, oxygen, carbon dioxide, and/or hydrogen sulfide concentration. The gas must be treated to meet pipeline specifications, liquified, or otherwise utilized. Renewable natural gas (RNG) generated from biogas is an emerging alternative energy source comprised of methane.

Biogas is obtained by a complex degradation process of organic matter that is performed by a set of bacteria under mostly anaerobic conditions. The biogas can get contaminated with atmospheric air to some degree affecting gas composition. Biogas is produced from a variety of organic materials in plants ranging from sewage treatment plants to organic waste utilization in landfill sites to farm biogas production that utilizes ecologically pure crops and manure. The resulting gas consists primarily of methane and carbon dioxide together with smaller amounts of other gases and vapors, such as hydrogen sulfide, ammonia, volatile organic compounds (VOCs), oxygen, nitrogen, and additionally of siloxanes for landfill gas. As shown by a considerable number of biogas plants around the world, biogas production and utilization can result in additional available energy with reduced emission of methane and carbon dioxide to the atmosphere and the production of valuable fertilizer. Several biogas utilization methods can be applied. Presently, the most popular approach is the production of combined heat and power (CHP) by means of internal combustion engines. The CHP process can be deployed if heat consumers are in the vicinity of the plant. However, this requirement cannot be met in most cases. As a result, the excess heat energy is frequently vented into the atmosphere, lowering the overall energy production efficiency and requiring additional electrical power for heat removal. The biogas upgrading to pipeline natural gas quality avoids this shortcoming and generates renewable natural gas (RNG). The upgraded biogas is in the form of a natural gas substitute and can be injected into existent natural gas grids or used as a vehicle fuel using the natural gas infrastructure. The upgraded biogas can be distributed at a low cost and utilized with higher efficiency by customers. However, to generate renewable natural gas, the raw biogas must be upgraded to customer's specification by removing multiple impurities, where the largest volumetric component is carbon dioxide, with other key impurities including hydrogen sulfide and oxygen.

Biogas contains a variable, but high, carbon dioxide content from 25 to 60 volumetric percent. The $H_2S$ concentration in the biogas usually ranges from 10 to 5,000 ppmv but can reach up to 30,000 ppmv (3% v/v) in some cases. To be used as a source of energy to generate heat and electricity or be used as a renewable natural gas, biogas must be cleaned ($H_2S$ and siloxane removed) and upgraded ($CO_2$ removed to product specification). The raw biogas can further contain oxygen in variable amounts that can require removal to meet pipeline specification and a significant amount of nitrogen that may require removal as well to meet pipeline specification for the total inert component.

A large fraction of the raw biogas gas streams exceeds the typical acid gas pipeline specification for carbon dioxide of no more than 2% and for hydrogen sulfide below 4 ppm. Since the feed gas may contain other sulfur-based compounds and inert gas nitrogen, the pipeline natural gas typically must contain 0.5 grains of total sulfur or less per 100 cubic feet of gas with total non-hydrocarbons of 5% or less. Before biogas can be sent to the supply pipeline, the carbon dioxide and hydrogen sulfide content must be reduced. Various techniques for acid gas removal, including absorption into an amine solution, cryogenic separation, adsorption, and membrane separation, have been used in the industry. Each has its advantages and disadvantages. It is also known to use a combination of these unit separation processes for acid gas removal.

Methods heretofore known for the purification of biogas, in particular, carbon dioxide gas removal, may be divided roughly into the following classifications:
   (a) Methods involving absorption separation unit operations, wherein water and, in particular, amine absorbent-based water solutions or physical solvents are utilized as an absorption media.
   (b) Methods involving membrane separation unit operations, wherein the carbon dioxide is removed by preferential permeation through a polymeric membrane.
   (c) Methods involving adsorption unit separation operations, wherein the carbon dioxide is removed by a thermal or pressure swing adsorption process. The most common adsorbent is activated carbon but other adsorbents, including zeolites, such as zeolite 5A, molecular sieve carbons, silica gel, activated alumina, or other adsorbents selective for carbon dioxide over methane are utilized as well.
   (d) Methods involving liquefaction and cryogenic distillation are utilized when products in a liquified form are desired.

Membrane processes for biogas upgrading have been reviewed by A. Makaruk et al. in Separation and Purification Technology 74 (2010) pp. 83-92.

Membrane separation units remove carbon dioxide by selective permeation of $CO_2$ from high pressure to low pressure across a polymeric membrane. Membrane systems have numerous attractive features, such as intrinsic simplicity, the lack of cyclic valve switching, and the ability to generate dry biomethane at elevated pressure. Polymeric membranes can lose treating capacity over time due to exposure to contaminants, such as heavy hydrocarbons, and adsorption processes are commonly used as a pretreatment for the removal of water, heavy hydrocarbons, and other contaminants. The intrinsic simplicity of membrane gas separation processes make them attractive for biogas processing to produce renewable natural gas. However, the efficient removal of carbon dioxide from raw biogas streams with a high methane product recovery and a high product purity by membrane processes requires staging. The membrane staging configuration must be optimized toward the specific application. Optimization of membrane separation units for removing carbon dioxide from natural gas is reviewed by Anjan K. Datta et al. in the Journal of Membrane Science 283 (2006) 291-300. Optimization of multistage membrane processes for the purification of biogas is reported by M. Scholz et al. in the Journal of Membrane Science 474 (2015) 1-10.

To generate pipeline specification RNG combined with high methane recovery from raw biogas by a membrane process requires extensive staging. Multi-stage membrane systems with extensive permeate gas recycling are required for high methane recovery. Several multi-stage membrane separation systems for raw biogas purification are disclosed in the art including in U.S. Pat. Nos. 11,498,026; 10,780,392; 10,589,215; 10,569,217; 10,471,380; 9,988,326; 9,770,687; U.S. Patent Application Publication Nos. US 2022/0297055 A1; US 2018/0250627 A1; US 2017/0283292 A1: European Patent Specification EP 3 446 771 B1, and international patent publication WO 2022/012944 A1. A three-stage membrane process for generating high-purity biomethane combined with high recovery from raw biogas is disclosed in U.S. Pat. No. 8,999,038. However, there is a disadvantage connected with a high flow of recycled permeated gas that leads to increases in compressor capacity and power consumption. To generate RNG with carbon dioxide concentrations as low as 50 ppm, a state-of-the-art multi-stage membrane system with a high 99.5% methane recovery, an increase of more than 60% in compressor capacity, is required for the feed raw biogas compression.

It is known to utilize membranes with tailored acid gas removal characteristics, such as $H_2S/CH_4$ gas separation characteristics, in biogas treatment. Y. Ding and M. Mitariten, in U.S. Patent Application Publication No. US 2020/0179868 A1, disclose a biogas treatment process that removes carbon dioxide and hydrogen sulfide from the biogas to generate pipeline specification RNG. Multiple types of membranes with properties tailored to hydrogen sulfide and carbon dioxide removal are utilized to remove acid gases. However, low membrane $H_2S/CH_4$ selectivity limits the range of biogas streams that can be treated to meet pipeline specifications and necessitates an additional method of $H_2S$ removal to meet product specification; the hydrogen sulfide removed by membrane processes must be sent to flair, leading to significant $SO_x$ emissions.

K. A. Lokhandwala et al., in U.S. Pat. No. 5,401,300, titled "Sour Gas Treatment Process Including Dehydration of the Gas Stream," disclose a membrane-based process for hydrogen sulfide removal combined with gas dehydration. However, low $H_2S/CH_4$ membrane selectivity limits the range of biogas streams that can be treated to meet pipeline specifications, and the hydrogen sulfide removed by membrane processes must be sent to flair, leading to significant $SO_x$ emissions.

Within the current state of the art, membrane systems can generate pipeline specification RNG products with carbon dioxide concentration under 2% with high methane recovery only by deploying a multi-stage membrane process configuration. These systems generate RNG with low energy consumption, significantly lower investment costs, and are easy to operate as compared to alternative purification processes. However, the generation of RNG products with low carbon dioxide concentrations, as low as 500 ppm and, in particular 50 ppm and below, required for liquefaction by membrane processes is not economical due to high compression energy consumption driven by high gas recycling volumes. The stand-alone membrane system is utilized primarily to remove carbon dioxide and the removal of multiple other impurities is carried out by auxiliary separation systems. Membrane systems exhibit modest $CO_2/CH_4$ gas selectivity. Meeting high-purity product requirements necessitates multi-stage membrane operation that increases complexity and cost.

State-of-the-art membrane systems are efficient in bulk carbon dioxide removal but require high electrical power consumption related to the recompression of recycled gases needed to attain high product purity combined with high methane recovery. Other impurities present in the raw biogas are removed by alternative separation processes, such as adsorption. In particular, the removal of hydrogen sulfide is carried out by adsorption processes before the gas is treated by a membrane process. Thus, there is still a need for an improved energy-efficient and lower-cost membrane-based biogas purification process that efficiently removes multiple contaminants including acid gases and oxygen while generating a high-purity renewable natural gas with high methane recovery.

SUMMARY OF THE INVENTION

The present invention provides a method and apparatus for the purification of raw biogas by a multi-stage membrane separation system that generates a high-purity Renewable Natural Gas (RNG) product with a high methane recovery. The method provides for the efficient removal of acid gases, such as carbon dioxide, hydrogen sulfide, and other impurities, from the raw biogas, while generating RNG that meets the most stringent product purity specification. It is an object of the present invention to generate RNG with residual carbon dioxide content of less than 500 ppm, preferably less than 50 ppm, combined with methane recovery of 99.5% or more. It is a further object of the instant invention to generate high-purity RNG while removing multiple impurities by the membrane system simultaneously. These and other objectives are accomplished by generating a high-purity RNG product while maintaining a low compression energy consumption The method and the apparatus of the invention provide for a novel integration of recycle streams generated by the multi-stage membrane system with compression equipment and other unit separation gas purification systems. The invention allows RNG production from a broad range of raw biogas streams, including landfill gas and digester gas.

The acid gases and a substantial fraction of oxygen are removed by the apparatus of the invention, which consists of a multi-stage membrane system integrated with two compressors. The individual components of the apparatus and their combination are optimized to increase hydrocarbon recovery, while removing acid gases and the bulk of oxygen. The apparatus deploys two gas recycle loops of permeate gas streams generated by the multi-stage membrane system—a high-pressure recycle circuit and a low-pressure recycle circuit integrated with high-pressure and low-pressure compressors. By utilizing two gas recycle circuits at two different pressures, it is possible to remove multiple contaminants at significantly lower compression energy utilization and capital and operating costs.

In one embodiment of the invention, the method of generating a high-purity hydrocarbon stream from a raw biogas feed stream containing methane, carbon dioxide, nitrogen, oxygen, water vapor, and hydrogen sulfide, wherein the raw biogas is available at substantially atmospheric pressure, comprises the steps of:

(i) compressing said raw feed gas stream mixed with a recycled permeate gas stream and a retentate gas stream generated by membrane separation units in a first compressor to a pressure from 6 to 25 barg followed by aftercooling and condensate separation, thereby forming a first effluent stream;

(ii) passing the first effluent stream into a first membrane separation unit, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream, said third effluent stream being removed at substantially atmospheric pressure or a sub-atmospheric pressure;

(iii) passing the second effluent stream to a second membrane separation unit, wherein the second membrane separation unit removes a portion of carbon dioxide, hydrogen sulfide, and oxygen from the second effluent stream, thereby forming a retentate fourth effluent stream having a lower carbon dioxide, hydrogen sulfide, and oxygen content as compared to the second effluent stream and a permeate fifth effluent stream enriched in carbon dioxide, hydrogen sulfide and oxygen content as compared to the second effluent stream;

(iv) compressing said third effluent stream mixed with a recycled permeate gas stream generated by a membrane separation unit in a second compressor to a pressure from 2 to 6 barg, thus forming a sixth effluent stream;

(v) passing the sixth effluent stream to a third membrane separation unit, wherein the third membrane separation unit removes a portion of carbon dioxide, hydrogen sulfide, water vapor, and oxygen from the sixth effluent stream, thereby forming a retentate eighth effluent stream having a lower carbon dioxide, hydrogen sulfide, and water vapor content as compared to the sixth effluent stream and a higher oxygen content as compared to the raw biogas feed stream and a permeate seventh effluent stream with a carbon dioxide concentration above 95 volumetric percent, wherein the seventh effluent stream is at substantially atmospheric pressure or a sub-atmospheric pressure;

(vi) passing the eighth effluent stream to a fourth membrane separation unit, wherein the fourth membrane separation unit removes a portion of carbon dioxide, hydrogen sulfide, water vapor, and oxygen from the eighth effluent stream, thereby forming a retentate tenth effluent stream having a lower carbon dioxide, hydrogen sulfide, and water vapor content as compared to the eighth effluent stream and a permeate ninth effluent stream with increased carbon dioxide content as compared to the eighth effluent stream, said ninth effluent stream being removed at substantially atmospheric pressure or a sub-atmospheric pressure;

(vii) passing said fifth permeate reject stream to a front end of the first compressor, wherein the fifth permeate stream defines the recycled permeate gas streams that is mixed with said raw feed gas stream in step (i);

(viii) passing said ninth permeate stream to a front end of the second compressor, wherein the ninth permeate stream defines the recycled permeate gas stream that is mixed with said third effluent gas stream in step (iv);

(ix) passing said tenth retentate stream to a front end of the first compressor, wherein the tenth retentate stream defines the recycled retentate gas stream that is mixed with said raw feed gas stream in step (i); and (x) collecting the fourth effluent stream generated by the second membrane generation unit as a high-purity hydrocarbon product, wherein the fourth effluent stream has an increased methane content and reduced hydrogen sulfide, oxygen, and carbon dioxide content as compared to the raw biogas feed stream;

(xi) and optionally collecting the seventh effluent stream as a product.

In another embodiment, the invention provides an apparatus to remove carbon dioxide, oxygen, water vapor, nitrogen, and hydrogen sulfide from the raw biogas. The apparatus for the purification of a raw biogas stream, available at a pressure that is substantially atmospheric, comprises:

(i) a first compressor that receives a combined feed gas stream comprised of the raw biogas feed stream and recycled permeate and retentate gas streams generated by membrane separation units to a pressure from 6 to 25 barg followed by aftercooling and condensate separation, thereby forming a first effluent stream;

(ii) a first membrane separation unit that receives the first effluent stream, the first membrane separation unit comprising a first membrane that removes a portion of carbon dioxide, oxygen, hydrogen sulfide, water vapor, and nitrogen from the first effluent stream, thereby forming a retentate second effluent stream having a lower carbon dioxide content as compared to the first effluent stream and a permeate fourth effluent stream enriched in carbon dioxide, hydrogen sulfide, water vapor and oxygen as compared to the first effluent stream;

(iii) a second membrane separation unit that receives the second effluent stream, the second membrane separation unit comprising a second membrane that removes a portion of carbon dioxide, hydrogen sulfide and oxygen from the second effluent stream, thereby forming a retentate fourth effluent stream having a lower carbon dioxide, hydrogen sulfide, and oxygen content as compared to the second effluent stream and a permeate fifth effluent stream enriched in carbon dioxide, hydrogen sulfide and oxygen content as compared to the second effluent stream;

(iv) a second compressor compressing a combined gas stream comprised of the third effluent stream and recycled permeate stream generated by a membrane separation unit in said second compressor to a pressure from 2 to 6 barg, thus forming a sixth effluent stream;

(v) a third membrane separation unit that receives the sixth effluent stream, the third membrane separation unit comprising a third membrane that removes a portion of carbon dioxide, hydrogen sulfide, water vapor, and oxygen from the sixth effluent stream, thereby forming a retentate eighth effluent stream having a lower carbon dioxide, hydrogen sulfide, and water vapor content as compared to the sixth effluent stream and a higher oxygen content as compared to the sixth effluent stream and a permeate seventh effluent stream enriched in carbon dioxide content and depleted in oxygen and methane content as compared to the sixth effluent stream, wherein the seventh effluent stream is at substantially atmospheric pressure or at a sub-atmospheric pressure;

(vi) a fourth membrane separation unit that receives the eighth effluent stream, the fourth membrane separation unit comprising a fourth membrane that removes a portion of carbon dioxide, hydrogen sulfide, water vapor, and oxygen from the eighth effluent stream, thereby forming a retentate tenth effluent stream having a lower carbon dioxide, hydrogen sulfide, and water vapor content as compared to the eighth effluent stream and a permeate ninth effluent stream enriched in carbon dioxide content and depleted in methane content as compared to the eighth effluent stream, wherein the ninth effluent stream is at substantially atmospheric pressure or at a sub-atmospheric pressure;

(vii) wherein the fifth effluent stream, containing recoverable methane, is recycled and combined with the raw biogas feed stream in (i);

(viii) wherein the ninth effluent stream is recycled and combined with the third effluent stream in (iv);

(ix) wherein the tenth effluent stream is recycled and combined with the raw biogas feed stream in (i); and (x) wherein the fourth effluent stream generated by the second membrane separation unit is collected as a methane product, wherein the fourth effluent stream has a reduced hydrogen sulfide, oxygen, and carbon dioxide content as compared to the raw biogas feed stream.

The second membrane separation stage of the apparatus can consist of two membrane separation modules in a sequence, wherein a first membrane separation module in the sequence receives the second effluent stream and generates an eleventh retentate stream with a reduced carbon dioxide, hydrogen sulfide, and oxygen content as compared to the second effluent stream, the eleventh effluent stream being treated in a second membrane separation module in the sequence that forms the second separation stage, wherein the second membrane separation module generates the fourth retentate stream with reduced carbon dioxide, hydrogen sulfide and oxygen content as compared to the eleventh effluent stream, and a permeate twelfth effluent stream enriched in carbon dioxide, hydrogen sulfide and oxygen content as compared to the eleventh effluent stream, wherein the twelfth effluent stream is used as a sweep gas on a permeate side of the first membrane separation module in the sequence and the combined gas stream comprised of the permeate gas generated by the first membrane separation module and the twelfth effluent stream generated by the second membrane module form the fifth effluent stream recycled to the front end of the first compressor.

In a further embodiment of the invention, the method of generating a high-purity hydrocarbon stream from a raw biogas feed stream containing methane, carbon dioxide, nitrogen, oxygen, water vapor, and hydrogen sulfide, wherein the raw biogas is available at substantially atmospheric pressure, comprises the steps of:

(i) compressing said raw feed gas stream mixed with a recycled permeate gas stream and a retentate gas stream generated by membrane separation units in a first compressor to a pressure from 6 to 25 barg followed by aftercooling and condensate separation, thereby forming a first effluent stream;

(ii) passing the first effluent stream into a first membrane separation unit, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream, said third effluent stream being removed at substantially atmospheric pressure or a sub-atmospheric pressure;

(iii) passing the second effluent stream to a second membrane separation unit, wherein the second membrane separation unit removes a portion of carbon dioxide, hydrogen sulfide, and oxygen from the second effluent stream, thereby forming a retentate fourth effluent stream having a lower carbon dioxide, hydrogen sulfide, and oxygen content as compared to the second effluent stream and a permeate fifth effluent stream enriched in carbon dioxide, hydrogen sulfide and oxygen content as compared to the second effluent stream;

(iv) compressing said third effluent stream mixed with a recycled permeate gas stream generated by a membrane separation unit in a second compressor to a pressure from 2 to 6 barg, thus forming a sixth effluent stream;

(v) passing the sixth effluent stream to a third membrane separation unit, wherein the third membrane separation unit removes a portion of carbon dioxide, hydrogen sulfide, water vapor, and oxygen from the sixth effluent stream, thereby forming a retentate eighth effluent stream having a lower carbon dioxide, hydrogen sulfide, and water vapor content as compared to the sixth effluent stream and a higher oxygen content as compared to the raw biogas feed stream and a permeate seventh effluent stream with a carbon dioxide concentration above 95 volumetric percent, wherein the seventh effluent stream is at substantially atmospheric pressure or a sub-atmospheric pressure;

(vi) passing the eighth effluent stream to a fourth membrane separation unit, wherein the fourth membrane separation unit removes a portion of carbon dioxide, hydrogen sulfide, water vapor, and oxygen from the eighth effluent stream, thereby forming a retentate tenth effluent stream having a lower carbon dioxide, hydrogen sulfide, and water vapor content as compared to the eighth effluent stream and a permeate ninth effluent stream with increased carbon dioxide content as compared to the eighth effluent stream, said ninth effluent stream being removed at substantially atmospheric pressure or a sub-atmospheric pressure;

(vii) passing said fifth permeate effluent stream to a front end of the first compressor, wherein the fifth permeate effluent stream defines the recycled permeate gas stream that is mixed with said raw feed gas stream in step (i);

(viii) passing said ninth permeate effluent stream to a front end of the second compressor, wherein the ninth permeate effluent stream defines the recycled permeate gas stream that is mixed with said third effluent gas stream in step (iv);

(ix) passing said tenth retentate effluent stream to a front end of the first compressor, wherein the tenth retentate effluent stream defines the recycled retentate gas stream that is mixed with said raw feed gas stream in step (i); and (x) collecting the fourth effluent stream generated by the second membrane separation unit as a high-purity hydrocarbon product, wherein the fourth effluent stream has an increased methane content and reduced hydrogen sulfide, oxygen, and carbon dioxide content as compared to the raw biogas feed stream;

(xi) and optionally collecting the seventh effluent stream as a product.

In one embodiment of the invention, a method of generating a high-purity hydrocarbon stream from a raw biogas feed stream comprised of methane, carbon dioxide, nitrogen, oxygen, water vapor, and hydrogen sulfide, available at a substantially atmospheric pressure, comprises the steps of:

(i) compressing said raw feed gas stream mixed with a first recycled permeate gas stream and a second recycled permeate gas stream in a first compressor to a pressure from 6 to 25 barg followed by aftercooling and condensate separation, thereby forming a first effluent stream;

(ii) passing the first effluent stream into a first membrane separation unit, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream, said third effluent stream being removed at substantially atmospheric pressure or a sub-atmospheric pressure;

(iii) passing the second effluent stream to a second membrane separation unit, wherein the second membrane separation unit removes a portion of carbon dioxide, hydrogen sulfide, and oxygen from the second effluent stream, thereby forming a retentate fourth effluent stream having a lower carbon dioxide, hydrogen sulfide, and oxygen content as compared to the second effluent stream and a permeate fifth effluent stream enriched in carbon dioxide, hydrogen sulfide and oxygen content as compared to the second effluent stream;

(iv) compressing said third effluent stream mixed with a third recycled permeate gas stream in a second compressor to a pressure from 2 to 6 barg, thus forming a sixth effluent stream;

(v) passing the sixth effluent stream to a third membrane separation unit wherein the third membrane separation unit removes a portion of carbon dioxide, hydrogen sulfide, water vapor, and oxygen from the sixth effluent stream, thereby forming a retentate eighth effluent stream having a lower carbon dioxide, hydrogen sulfide, and water vapor content as compared to the sixth effluent stream and a higher oxygen content as compared to the raw biogas feed stream and a permeate seventh effluent stream with a carbon dioxide concentration above 95 volumetric percent, wherein the seventh effluent stream is at substantially atmospheric pressure or a sub-atmospheric pressure;

(vi) passing the eighth effluent stream to a fourth membrane separation unit wherein the fourth membrane separation unit removes a portion of carbon dioxide, hydrogen sulfide, water vapor, and oxygen from the eighth effluent stream, thereby forming a retentate tenth effluent stream having a lower carbon dioxide, hydrogen sulfide, and water vapor content as compared to the eighth effluent stream and a permeate ninth effluent stream with increased carbon dioxide content as compared to the eighth effluent stream, said ninth effluent stream being removed at substantially atmospheric pressure or a sub-atmospheric pressure;

(vii) passing said ninth permeate effluent stream to a front end of the second compressor, wherein the ninth permeate effluent stream defines the third recycled permeate gas stream that is mixed with said third effluent gas stream in step (iv);

(viii) passing the fourth effluent gas stream to a fifth membrane separation unit wherein the fifth membrane separation unit removes a portion of carbon dioxide, hydrogen sulfide, water vapor, and oxygen from the fourth effluent stream, thereby forming a retentate twelfth effluent stream having a lower carbon dioxide, hydrogen sulfide, oxygen and water vapor content as compared to the fourth effluent stream and a permeate eleventh effluent stream having a higher carbon dioxide, hydrogen sulfide, water vapor and oxygen content as compared to the fourth effluent stream, wherein the eleventh effluent stream is at substantially atmospheric pressure or a sub-atmospheric pressure;

(ix) passing said eleventh permeate effluent stream to a front end of the first compressor, wherein the eleventh permeate effluent stream defines the second recycled permeate gas stream that is mixed with said raw feed gas stream in step (i);

(x) passing said tenth retentate effluent stream to a permeation side of the second membrane separation unit to act as a sweep gas, wherein the tenth retentate effluent stream combined with the permeate fifth effluent stream generated by the second membrane separation unit defines the first recycled permeate gas stream that is mixed with said raw feed gas stream in step (i); and (xi) collecting the twelfth effluent stream generated by the fifth membrane separation unit as a high-purity hydrocarbon product, wherein the twelfth effluent stream has an increased methane content and reduced hydrogen sulfide, oxygen, and carbon dioxide content as compared to the raw biogas feed stream.

The multi-stage membrane apparatus of this invention removes acid gases, carbon dioxide and hydrogen sulfide, from the raw biogas stream to meet stringent product purity specifications. In some embodiments, acid gas removal is combined with the removal of other contaminants, such as oxygen, by the membrane system. The raw biogas can contain variable concentrations of oxygen and nitrogen. The oxygen concentration can be as high as 4% and must be removed to meet the pipeline product specification. In many embodiments, the multi-stage membrane system provides for the efficient removal of oxygen to meet pipeline specifications and supplemental removal of nitrogen.

The above and other features of the invention, including various novel details of construction and combinations of parts, and other advantages will now be more particularly described with reference to the accompanying figures and pointed out in the claims. It will be understood that the particular method and apparatus embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

Figure 1:
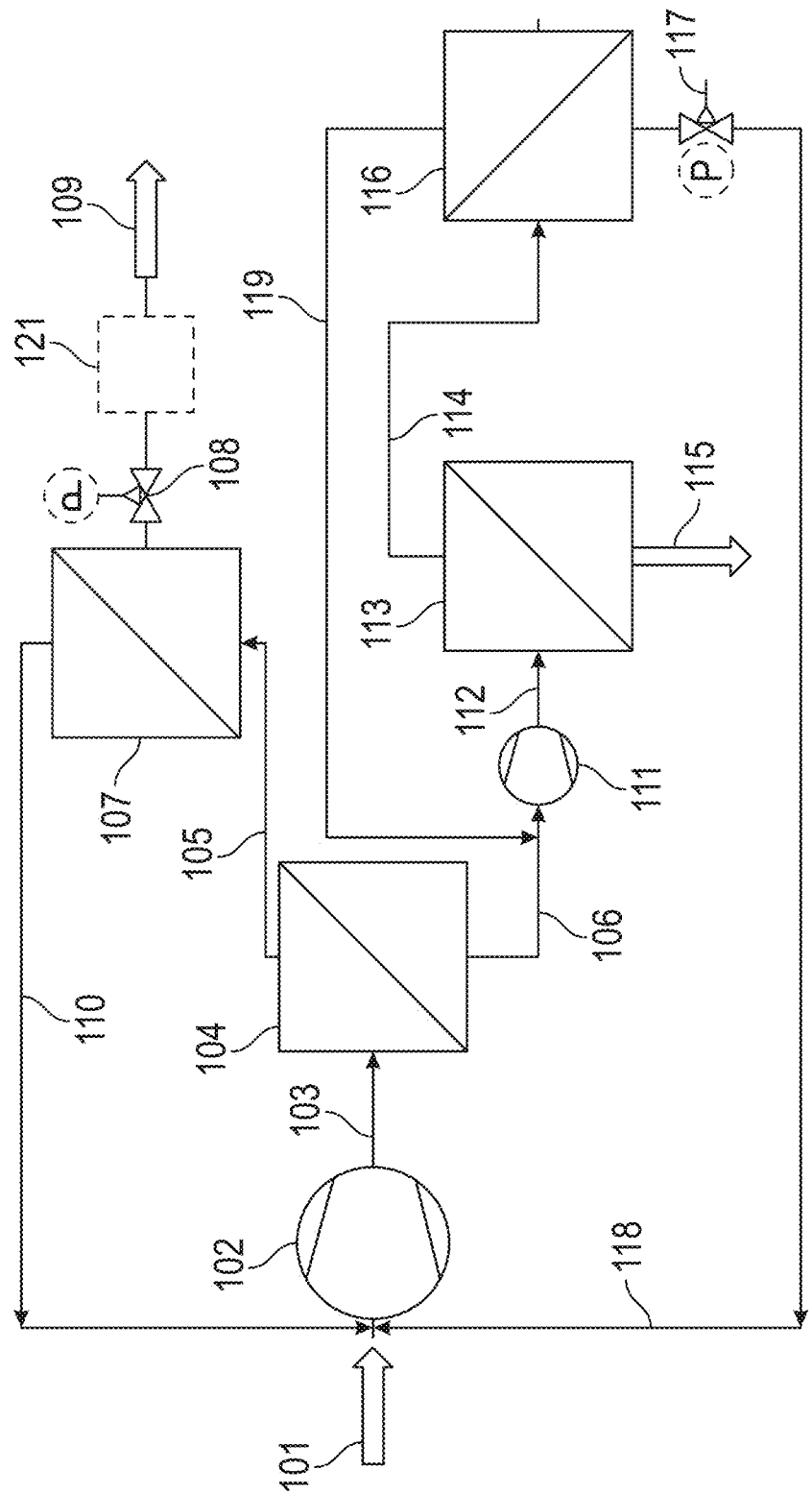
FIG. 1 is a schematic drawing of one exemplary embodiment of a method according to the invention, wherein a low-pressure biogas gas containing acid gases $CO_2$ and $H_2S$, water vapor, oxygen, and nitrogen is treated in a system comprised of a high-pressure compressor, a second low-pressure compressor, and a four-stage membrane system. The multistage membrane system features three recycle streams designed to increase methane recovery. The permeate gas streams generated by the second membrane separation system and the retentate gas stream generated by the third membrane separation system are recycled to the front end of the high-pressure compressor. The permeate gas generated by the fourth membrane separation system is recycled to the front end of the low-pressor compressor.

The present invention provides an improved method and apparatus for producing a high-purity renewable methane stream with methane recovery of 99.5% or higher from a broad range of raw biogas streams. Carbon dioxide and other impurities, including hydrogen sulfide, water vapor, oxygen, and nitrogen, are removed by a multi-stage membrane separation system integrated with two compressor systems. The multi-stage membrane system provides for the simultaneous removal of carbon dioxide, hydrogen sulfide, water vapor, and oxygen from raw biogas. The multi-stage membrane system features two permeate gas recycle streams and one retentate recycle stream generated by the multi-stage membrane system designed to increase methane recovery, while generating a product purity with carbon dioxide concentration below 1000 ppm, in some embodiments below 50 ppm and in some embodiments as low as 30 ppm. In one embodiment of the invention, the raw biogas available at atmospheric pressure is treated by a system consisting of four membrane separation stages integrated with high-pressure and low-pressure compressors to generate high purity renewable natural gas (RNG). The permeate gas stream generated by the second membrane separation system and the retentate gas stream generated by the fourth membrane separation system are recycled to the front end of the high-pressure compressor. The permeate gas stream generated by the fourth membrane system is recycled to the front end of the low-pressure compressor. These recycle streams form high-pressure and low-pressure recycle loops that reduce the overall compression energy consumption. The recompression of the carbon dioxide-enriched permeate stream in the low-pressure loop requires a lower energy consumption than the permeate gas compression and recycling in the high-pressure loop. An important feature of the invention is the enhanced level of enrichment of carbon dioxide and other impurities in the recycle gas stream in the low-pressure recycle loop as compared to the high-pressure recycle loop. The increased level of impurity enrichment allows for more efficient removal of these impurities by the third membrane separation stage in the $CO_2$-enriched permeate stream. The removal of components that constitute impurities is less efficient in the high-pressure circuit due to the comparatively lower level of their enrichment in the recycle stream.

Raw biogas refers to a multi-component gas mixture generated by an anaerobic digestion process which is to be separated using the process of the present invention. Feed gas stream refers to a process stream that is supplied to the intake of the compressor. The feed gas stream corresponds to the raw biogas stream combined with recycle streams from the multi-stage membrane separation system, wherein the combined stream is directed to the primary high-pressure compressor intake port. In some embodiments, the raw biogas underwent preliminary purification to remove certain impurities, such as ammonia, and/or VOCs, or to reduce the water vapor dew point before the gas is directed to the intake of the compressor. The raw biogas may be available at atmospheric pressure or can come from a source that is already at a pressure above atmospheric pressure. The raw biogas that underwent preliminary purification can also be available at above atmospheric pressure. However, the feed gas stream will require pressurization before being processed by the method of the invention. The raw biogas or the feed gas stream is specified as available at a substantially atmospheric pressure to indicate the need to compress the gas prior to gas processing to remove undesirable impurities by the method of the invention.

The carbon dioxide concentration of biogas varies from above 25% to as high as 60%, more commonly from 30% to 55%. Biogas is water vapor saturated and can contain a variable amount of hydrogen sulfide, that in most cases can be between 300 and 3,000 ppm, oxygen, nitrogen, VOCs, and other impurities that must be removed to generate a target purity product. In particular, the carbon dioxide must be removed, and the caloric value of the product gas increased before gas utilization for direct heat and power generation, for injecting the RNG product into the distribution grid or liquefaction (in the latter case $CO_2$ concentration should be as low as 50 ppm or below 30 ppm for some technological cases). The raw biogas available at a pressure that is substantially atmospheric is compressed and treated in a four-stage membrane separation system of the instant invention to remove carbon dioxide, hydrogen sulfide, water vapor, and oxygen. The carbon dioxide concentration must be reduced to meet the local pipeline specification, which can vary from 5% to 2% mol or to as low as 2000 ppm or 1000 ppm if the feed gas contains a significant amount of inert gas components, such as nitrogen, or to as low as 30 ppm or 50 ppm if the biomethane is utilized for liquefaction. For liquefaction purposes, the gas must be further dehydrated to 0.1 ppm or as low as 1 ppm of the water vapor content.

The raw biogas stream can contain a significant amount of hydrogen sulfide and other sulfur-containing impurities that must be removed to meet customer product specifications. The hydrogen sulfide concentration can be as low as 10 ppm or as high as 3% and above for some biogas streams. To meet the pipeline gas specification the concentration of impurities must be reduced to a typical pipeline specification of hydrogen sulfide: 0.25-0.3 g/100 scf (6-7 mg/m$^3$) or less; total sulfur: 5-20 g/100 scf (115-460 mg/m$^3$) or less; water vapor: 4.0-7.0 lb/MM scf (60-110 mg/m$^3$) or less, and oxygen: 1.0% or less with total non-hydrocarbons content of 5% or less.

Figure 4:
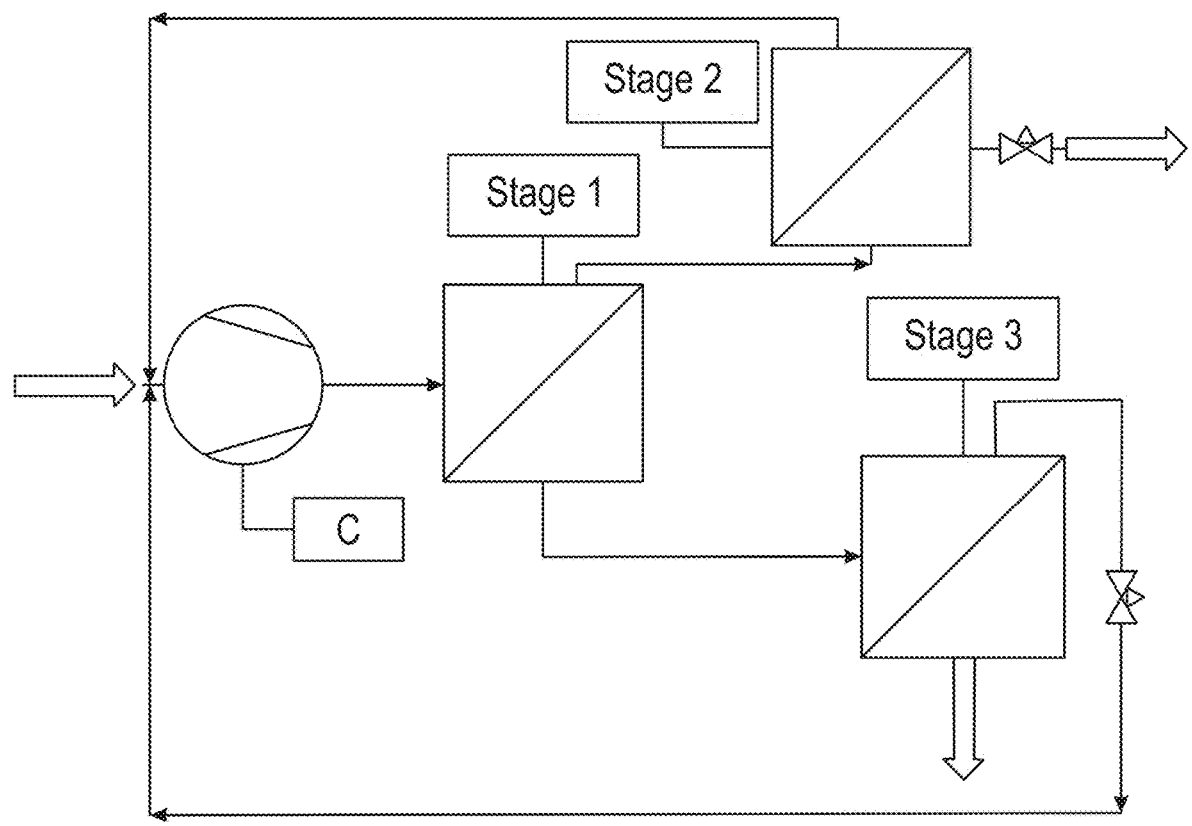
FIG. 4 is a schematic drawing of the raw biogas processing method disclosed in the prior art. The low-pressure biogas is treated in a membrane separation system composed of one feed compressor and a three-stage membrane system without gas recompression between membrane stages.

Referring to FIG. 4, one of the known process configurations used commercially in processing raw biogas to generate renewable natural gas (RNG) with the pipeline purity specification (below $CO_2$ concentration of 2% mole) combined with 99.5% methane recovery is a three-stage membrane configuration (Stage 1, Stage 2, Stage 3) with one feed compressor (C). To optimize process economics, it is known in the art to deploy membranes with different gas separation and gas permeation characteristics in different membrane stages of the three-stage system. It is known to utilize membranes with high $CO_2/CH_4$ separation characteristics in stages 1 and 3 (preferable with $CO_2/CH_4$ separation factors of 50 or above) while deploying membranes with a higher $CO_2$ gas processing capacity in stage 2 as compared to stages 1 and 3 but with a lower $CO_2/CH_4$ gas separation factor (preferably 20 and above) to lower costs associated with membrane module installation without a major increase in compression process energy consumption.

The process, however, becomes uneconomical when a deep level of $CO_2$ gas removal is required to generate a high-purity RNG product, most significantly below a $CO_2$ gas concentration of 0.1% mole. The increase in cost is due to a dramatic increase in the membrane processing area requirements through all three stages and an increase in compression energy due to an increase in gas recycle volumes. Deep $CO_2$ gas removal is needed to generate a methane gas product that can be economically liquified. A deeper level of $CO_2$ gas removal need can also occur when a significant amount of nitrogen is present in the feed gas. To meet pipeline specifications for a maximum allowed concentration of inert components, the combined $CO_2+N_2$ gas concentration in the product must be maintained below 4%. For direct liquefaction, the $CO_2$ gas concentration must be reduced to 500-2000 ppm or preferably as low as 50 ppm. Levels above 50 ppm require further purification by adsorption processes before liquefaction.

The increase in membrane area processing capacity to generate high-purity RNG is driven by several factors. In particular, the deep $CO_2$ gas removal requirement generates a low concentration of $CO_2$ in the permeate gas of the second membrane stage that is recycled to the front end of the compressor. This, in turn, leads to an increase in the acid gas removal load on the first and second stages, leading to an unacceptable increase in membrane processing area.

The economical processing of biogas to generate RNG is limited to methane gas product purity by the three-stage, one feed compressor process configuration to about 0.1% mole of $CO_2$.

It has been discovered, surprisingly, that a high-purity RNG product combined with a high methane recovery can be generated by the method of the instant invention; the method schematic is depicted in FIG. 1. The multi-stage membrane system provides for the simultaneous removal of carbon dioxide, hydrogen sulfide, water vapor, and oxygen from raw biogas. Carbon dioxide and other impurities are removed by the multi-stage membrane separation system integrated with two compressors—a high-pressure and a low-pressure compressor system. The membrane system features two permeate gas recycle streams and one retentate recycle stream generated by the multi-stage membrane system designed to increase methane recovery, while generating a high-purity product. The carbon dioxide product concentration can be reduced to as low as 50 ppm and in some embodiments as low as 30 ppm. The permeate gas streams generated by the second and fourth membrane separation units of a four-stage membrane system are recycled to the front end of the high-pressure and low-pressor compressors, respectively. These recycle gas streams form high-pressure and low-pressure recycle loops that reduce the overall compression energy consumption. The recompression of the carbon dioxide-enriched permeate stream in the low-pressure loop requires a lower energy consumption than the permeate gas recompression in the high-pressure loop. An important feature of the invention is the enhanced level of enrichment in the recycled gas of carbon dioxide and other impurities in the low-pressure recycle loop as compared to the high-pressure recycle loop. The removal of components that constitute impurities is less efficient in the high-pressure circuit.

An important aspect of the instant invention is the selection of optimal compression ranges between the high-pressure and the low-pressure permeate gas recycle loops. The feed raw biogas available at substantially atmospheric pressure is compressed in the first, high-pressure compressor to between 6 and 25 barg, preferably between 10 and 16 barg. The second compressor is deployed to increase the gas pressure of the sixth effluent stream directed into the third membrane separation unit. The sixth effluent stream is composed of the third effluent stream generated by the first membrane separation unit mixed with a second recycled permeate gas stream generated by the fourth membrane separation unit and is compressed to pressure from 2 to 6 barg, preferably to 3 to 4 barg. High levels of compression above 4 barg generate an excessive Joule-Thomson cooling effect during carbon dioxide permeation in the third membrane system that can lead to water and even carbon dioxide freezing.

In most cases, the separation system elements of the apparatus of the present invention are configured such that a compressor, upstream of the first membrane separation stage, is used to generate the dominant driving force for membrane process separation stages with a second, low-pressure compressor providing a supplemental driving force. In some embodiments, at least one vacuum device in at least one of the membranes' permeate streams, is used to generate an additional driving force. The additional driving force in some embodiments is provided by an interstage booster.

The membrane separation units or stages are comprised of one or more membrane modules equipped with polymeric membranes. The membranes are preferably in a hollow fiber configuration. The hollow fiber membrane modules can be configured with shell side feed or bore side feed with the bore side feed being preferred. Membrane permeance is defined as material flow per unit of time, unit of membrane area, and differential pressure through a membrane. The term membrane selectivity as used and claimed in the present invention to characterize membrane performances is pure gas selectivity, independent of whether membranes are used to separate a two-component or a multi-component gas mixture. The selectivity for hollow fiber membranes is calculated as a quotient of the permeances of two pure gases at room temperature and differential pressure of 5 barg and is an indication of how well the membrane can separate a two-component gas mixture.

Membrane permeate refers to the gas stream obtained on the low-pressure side of the membrane, membrane module, or membrane separation step. Permeate gas refers in each case to gas generated by permeation through a polymeric membrane with gas component(s) enriched in the permeate stream relative to the respective feed stream at the membrane, at the membrane module, or in the membrane separation step. Retentate refers to the entire stream that is obtained on the high-pressure side of the membrane, membrane modules, or membrane separation step that does not pass through the membrane. Retentate gas refers to the component(s) enriched in each case in the retentate stream relative to the respective feed stream at the membrane, at the membrane module, or in the membrane separation step.

The raw feed biogas is available at a pressure that is substantially atmospheric and is compressed prior to being treated by the method of the invention, with the product methane gas directed into a pipeline or otherwise utilized. The feed gas is compressed to a pressure between 6 and 25 barg, preferably between 10 and 16 barg. Pressures below 6 barg result in a dramatic increase in the required membrane area, while pressures above 25 barg result in a significant increase in energy consumption required for the recycled gas recompression. The compressed feed biogas is treated in the first membrane separation unit, wherein the carbon dioxide, hydrogen sulfide, water vapor and oxygen are removed by permeation. The retentate non-permeate gas generated by the first membrane separation unit may still contain an excess of carbon dioxide and, thus, is treated in an additional second membrane separation unit. The retentate from the second separation unit constitutes the RNG product. The permeate gas generated by the second membrane separation unit gas is collected at an atmospheric pressure or a sub-atmospheric pressure, The permeate gas generated by the second membrane separation unit contains a significant amount of recoverable methane. Thus, this permeate gas stream is recycled to the front end of the first, high-pressure compressor and combined with the raw biogas to increase methane recovery. The first and second membrane separation units form the first, high-pressure recycle loop.

The permeate gas generated by the first membrane separation unit is collected at an atmospheric or sub-atmospheric pressure combined with the permeate gas stream generated by the fourth membrane separation unit and compressed in a second low-pressure compressor to a pressure between 2 and 6 barg, preferably between 3 and 4 barg, to form a sixth effluent stream. The sixth effluent stream is treated in a third membrane separation unit that removes additional impurities, including carbon dioxide, by permeation to generate a permeate gas stream with carbon dioxide concentration above 90 mole percent, preferably above 95 mole percent, most preferably above 98 mole percent. Compressing the sixth effluent stream to a pressure below 2 barg results in a sharp increase in the required membrane area, while pressures above 6 barg result in excessive energy consumption. The permeate gas stream generated by the third membrane separation unit can be collected at substantially atmospheric or sub-atmospheric pressure. The permeate gas can be collected at above atmospheric pressure, such as 0.5 barg, for further processing. Collecting the permeate gas at these pressures is defined as substantially atmospheric. The permeate stream can be further treated to remove hydrogen sulfide before utilization or disposal. The preferred method of hydrogen sulfide removal from the low-pressure gas comprised primarily of carbon dioxide is by a biological hydrogen sulfide removal process.

The retentate gas generated by the third membrane separation unit contains recoverable methane and is directed to a fourth membrane separation unit. The fourth membrane separation unit separates this retentate stream into a low-pressure permeate gas enriched in carbon dioxide and a retentate high-pressure stream depleted of carbon dioxide. The permeate gas generated by the fourth membrane separation unit is recycled to the front end of the second low-pressure compressor. The third and fourth membrane separation units form the second low-pressure recycle loop. The retentate stream generated by the fourth membrane separation unit contains recoverable methane and is recycled to the front end of the first, high-pressure compressor.

Some biogas gas may contain a significant concentration of inert impurities, such as nitrogen, in addition to oxygen. The RNG product gas carbon dioxide concentration may need to be reduced further to meet the consumer's total inert gas concentration limit. The excess nitrogen is removed by a pressure swing adsorption (PSA) system, together with oxygen.

The raw biogas can further contain a number of impurities in variable concentrations that must be removed prior to the gas being treated by membrane separation units following compression. These impurities may include siloxanes and volatile organic hydrocarbons, among others. These impurities are removed by methods well-known in the art and can include adsorption by activated carbon. It is within the scope of the invention to remove some impurities prior to compression while removing the rest of the impurities following compression.

The apparatus of the instant invention is equipped with polymeric membrane separation units. The use of polymeric membranes to purify biogas is known in the art. The membranes are in a hollow fiber configuration and are fabricated from engineering polymers, including polyimides and polysulfones. The polyimides disclosed in U.S. Pat. No. 5,591,250 and WTO International Publication Number WO 2011/009919 A1 are particularly preferred. The membrane separation units are comprised of one or more membrane separation modules equipped with polymeric gas separation membranes with modules arranged in series or in parallel. The hollow fiber membranes are packaged into modules with the bore side feed gas configuration most common in biogas treatment. The modules preferably operate in the counter-current flow mode between the feed and permeate gas streams to increase thermodynamic separation efficiency and reduce methane gas loss. Each module has polymeric membranes with a defined high-pressure side and low-pressure side, and each module has an inlet port connected to the high-pressure side, a retentate outlet port, and a permeate outlet port, therein the retentate outlet port providing an outlet for gas on the high-pressure side, and the permeate outlet port providing an outlet for gas on the low-pressure side. The feed gas is conveyed into the inlet port, the retentate gas is conveyed from the retentate outlet port, and the permeate gas is conveyed from the permeate port.

The modules are equipped with semipermeable polymeric membranes exhibiting a $CO_2/CH_4$ gas separation factor above 20, preferably above 35, and most preferably above 40, a hydrogen sulfide/methane separation factor above 9, preferably above 15, and most preferably above 20, and an oxygen/nitrogen separation factor above 5, preferably above 6 and most preferably above 7, as measured at room temperature utilizing pure gases. The membrane in stage one further exhibits a high oxygen/methane separation above 7, and most preferably above 9, as measured at room temperature. To enable nitrogen removal from the biogas, the polymeric membrane must exhibit a nitrogen/methane separation factor above 2, preferably above 2.7. The gas separation efficiency is affected by the pressure ratio, i.e., the feed gas to the permeate gas pressure ratio. To maintain high separation efficiency, the permeate gas from the third membrane separation unit is preferably collected at a low pressure, i.e., at atmospheric or sub-atmospheric pressure.

Membrane separation efficiency can deviate from an ideal preferred counter-current performance at high operational stage cuts. In hollow fiber membrane devices, several factors, including the non-uniformity of hollow fiber dimensions, can decrease membrane performance at high stage cuts. An added benefit of the method of the instant invention is the decrease in operational stage cut for membrane separation stages two and three as compared to the prior art. The reduction in the operation stage cut provides a material improvement in the commercial hollow fiber membrane separation module's performance. The polymeric membranes further exhibit high water vapor permeance combined with a high $H_2O/CH_4$ separation factor. The water vapor is removed by permeation, generating the RNG product that meets the most stringent product specification.

It is further within the scope of the invention to deploy membranes with different separation characteristics in the first, second, third, and fourth membrane separation units. The first stage membrane separation unit is configured to remove $CO_2$, $H_2S$, water vapor, and $O_2$ from the methane by utilizing a membrane with high $CO_2/CH_4$, $H_2S/CH_4$, and high $O_2/CH_4$ selectivity. The third stage membrane separation unit is configured to concentrate methane in the retentate stream, while removing carbon dioxide, hydrogen sulfide, water vapor, and oxygen into the low-pressure permeate stream utilizing membranes with a high separation efficiency. The retentate stream generated by the third membrane separation unit is directed into the fourth membrane separation unit for further methane recovery. By configuring the third membrane separation unit with a membrane exhibiting $CO_2/CH_4$ selectivity above 40, a higher-purity carbon dioxide can be generated for independent use or sequestration. The second and the fourth membrane separation units preferably are configured to increase membrane gas processing capacity by using highly permeable membranes with a lower $CO_2/CH_4$ gas selectivity as compared to the first and the third membrane separation units.

The operating temperature in each membrane stage may be the same or different to optimize the overall separation efficiency. The gas may be preheated or cooled between stages to control the temperature. The RNG product pressure can be further boosted to meet the pipeline pressure or consumer specification.

The membrane productivity (permeance) and selectivity are a function of specific membrane selection as well as operating process conditions, such as temperature, and for some membrane materials, the separation efficiency can be further affected by the partial pressure of carbon dioxide in the feed. The optimal membrane area selection for each membrane separation stage is driven by membrane performance characteristics and process conditions as would be known to those skilled in the art. The membrane area for each membrane stage is optimized by the number of modules selected and arranged in parallel. A series arrangement is less favorable since it can increase the pressure drop through the unit.

The product purity with respect to carbon dioxide concentration is controlled primarily by valves positioned on the retentate lines of membrane separation units two and four and, additionally, by regulating the gas processing capacity of the stages (via the selection of polymeric membrane gas processing characteristics and adjustment of membrane surface area in the stages). Process parameters, in particular the temperature of individual membrane stages, are further used to control membrane performance. The methane product purity and recovery are controlled by retentate valve settings that, in turn, control the stage cut of membrane separation stages. Namely, the ratio of the permeate gas volume to the feed gas volume—the stage cut, i.e., the fraction of the feed gas conveyed to the membrane permeate side, wherein the impurities are removed. Thus, a valve position on the retentate line determines retentate product purity. A valve position on the retentate line of the second membrane separation unit controls the final carbon dioxide product purity by determining the permeate gas volume directed to recycle. A valve position on the retentate line of the fourth membrane separation unit determines the carbon dioxide concentration of the retentate gas and the amount of gas volume generated by the fourth membrane separation unit recycled to the front end of the high-pressure compressor.

The low-pressure biogas gas containing acid gases $CO_2$ and $H_2S$, water vapor, oxygen, and nitrogen is treated by the apparatus of the invention that includes two compressors (a high-pressure compressor and a low-pressure compressor), and a four-stage membrane system. The apparatus is shown schematically in FIG. 1. The four-stage membrane apparatus features two permeate gas recycle streams, and one retentate gas recycle stream designed to increase methane recovery. It was found surprisingly that to generate an RNG product with carbon dioxide concentration below 0.1% mole and methane recovery above 95%, preferably above 99% and most preferably above 99.5%, economically, the following process conditions must be implemented: (i) the raw biogas must be compressed to a pressure from 10 to 16 barg followed by aftercooling and condensate separation, (ii) the third permeate effluent stream generated by the first membrane separation unit combined with the ninth permeate effluent stream generated by the fourth membrane separation unit must be compressed by the second, low-pressure compressor to pressure from 3 to 4 barg, and (iii) the carbon dioxide concentration of the second retentate effluent stream generated by the first membrane separation unit must be maintained between 20 and 8% mole. RNG product carbon dioxide concentration of the fourth effluent stream generated by the second membrane separation unit can be thus reduced to below 1% mole, preferably below 500 ppm, most preferably below 50 ppm, while maintaining the overall methane recovery by the process above 99%, preferably above 99.5%.

The method of the invention, wherein a low-pressure biogas gas containing acid gases $CO_2$ and $H_2S$, water vapor, oxygen, and nitrogen is treated to generate renewable natural gas (RNG) is shown schematically in FIG. 1. The apparatus includes two compressors (high-pressure and low-pressure compressors), and a four-stage membrane system. The four-stage membrane system features two permeate recycle streams, and one retentate recycle stream designed to increase methane recovery.

With reference to FIG. 1, the raw feed biogas (101) is combined with the permeate gas recycle stream (110) generated by the second membrane separation unit (107) and the retentate gas recycle stream (118) generated by the fourth membrane separation unit (116) and compressed in compressor (102), followed by aftercooling and condensate separation (not shown) forming the first effluent stream (103). The first effluent stream (103) is treated in the first membrane separation unit (104) that removes carbon dioxide, hydrogen sulfide, water vapor, oxygen, and nitrogen, thus forming a third permeate effluent stream (106) and the second retentate effluent stream (105), depleted in carbon dioxide, hydrogen sulfide, water vapor, oxygen, and some fraction of nitrogen as compared to the first effluent stream (103).

The second retentate effluent stream (105) is treated in the second membrane separation unit (107) that removes additional carbon dioxide, hydrogen sulfide, oxygen, and some fraction of nitrogen, thus forming the fifth permeate effluent stream (110) and the fourth retentate effluent stream (109) collected as RNG product. The fifth permeate effluent stream (110) is collected at atmospheric pressure or a sub-atmospheric pressure and is recycled to the front end of the compressor (102) to increase methane recovery.

The third permeate effluent stream (106) is collected at substantially atmospheric or sub-atmospheric pressure. The third effluent stream (106) is combined with a ninth permeate effluent stream (119) and the pressure of the combined streams is boosted by a compressor (111) to generate the sixth effluent stream (112) that is being treated in the third membrane separation unit (113). The third membrane separation unit (113) generates the seventh permeate effluent stream (115), comprised of carbon dioxide with a volumetric concentration above 90%, and the eighth retentate effluent stream (114), enriched in methane, oxygen, and nitrogen content. The seventh permeate effluent stream (115) is collected at substantially atmospheric or sub-atmospheric pressure (permeate collected at an elevated pressure in the range of 0.5 barg is defined as substantially atmospheric). In some embodiments, the seventh effluent stream (115) is removed at a sub-atmospheric pressure above 0.2 bara by way of a vacuum pump (not shown).

The eighth effluent stream (114), containing recoverable methane, is treated in the fourth membrane separation unit (116) to generate the retentate tenth effluent stream (118), enriched in methane content, and the permeate ninth effluent stream (119), enriched in carbon dioxide content. The permeate ninth effluent stream (119) is recycled to the front end of the compressor (111) and combined with the third effluent stream (106). The combined streams are compressed in the compressor (111) to form the sixth effluent stream (112). The tenth retentate stream (118), containing recoverable methane, is recycled to the front end of the compressor (102) and combined with the raw biogas stream (102) and the fifth effluent permeate stream (110). The combined streams are compressed in the compressor (102) to form the first effluent stream (103).

The method of the invention is optimized to reduce methane losses and generate RNG with a high methane recovery, preferably above 99.5%. To reduce methane loss, the carbon dioxide concentration in the seventh effluent stream (115) is maintained above 90 mole percent, preferably above 95 mole percent, most preferably above 98 mole percent.

The seventh effluent stream (115), comprised primarily of carbon dioxide, hydrogen sulfide, oxygen, and water vapor, can be utilized to generate a supplemental carbon dioxide product pending additional purification. Additional purification to remove hydrogen sulfide may be necessary before the stream can be dispersed into the atmosphere. The preferred method of hydrogen sulfide removal is by a biological desulfurization process.

Biological desulfurization technologies are well established and their use for biogas treatment can be generically divided into segments that differ in methods of oxygen introduction and utilization in the bioprocess. Oxygen is the prerequisite to enable $H_2S$ oxidation and removal and proceeds according to the following mechanisms:

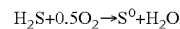

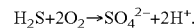

The process proceeds with $H_2S$ oxidation to elemental sulfur and/or sulfuric acid. The oxygen supply and process conditions determine the balance between sulfur and sulfuric acid formation.

The apparatus of this invention may further include an adsorption based $H_2S$ removal unit to reduce the hydrogen sulfide concentration of the fourth effluent stream (109) below 4 ppm prior to utilization. The optional auxiliary adsorption unit (121) can utilize an activated carbon adsorbent optimized for $H_2S$ removal or other adsorbent materials as is well known in the art. The apparatus may further include an additional oxygen removal unit. The thermal oxidation oxygen removal unit can be positioned between the first membrane separation unit (104) and the second membrane separation unit (107). The second membrane separation unit (107) beneficially removes water vapor generated by the thermal oxidation unit, eliminating the need for a separate dryer. Alternatively, the thermal oxidation oxygen removal unit can be positioned to treat the final product, the fourth effluent stream (109). In this case, the thermal oxidation unit must be followed by the water removal unit. The optional deoxygenation auxiliary units are not shown.

The product RNG stream is generated with a carbon dioxide concentration below 1 mol %, preferably below 500 ppm, most preferably below 50 ppm, and reduced oxygen concentration.

The RNG product methane purity of the fourth effluent stream (109) is a function of the stage cut of the second membrane separation unit (107), which is controlled by the valve (108). The gas composition of the second effluent stream (105) treated in the second membrane separation unit (107) is determined by the gas processing capacity of the first and second membrane separation units (104, 107) and the gas permeation/separation characteristics of the polymeric membrane deployed at the process pressure and temperature conditions. These factors, in turn, determine the stage cut at which the first membrane separation unit (104) operates (the ratio of the permeate gas flow volume to the feed gas flow volume). It was found surprisingly that the carbon dioxide concentration in the second effluent stream (105) that is treated in the second membrane separation unit (107) must be maintained between 20 and 8 mole percent, preferably between 12 and 8 mole percent, to minimize the separation process energy consumption. The high carbon dioxide concentration of the second retentate effluent stream (105), in turn, necessitates a high concentration carbon dioxide ratio reduction in the second membrane separation unit (107) to reduce the concentration of carbon dioxide from circa 10% to a carbon dioxide purity in the product stream as low as 50 ppm.

Carbon dioxide, hydrogen sulfide, and other impurities are removed in the seventh effluent stream (115). The carbon dioxide concentration of the seventh effluent stream (115) is a function of the stage cut of the third membrane separation unit (113) (the ratio of the permeate gas flow volume to the feed gas flow volume) and gas separation characteristics of polymeric membranes deployed in the third and fourth membrane separation units (113, 116). A high $CO_2/CH_4$ gas separation factor above 40 and a high $H_2S/CH_4$ gas separation factor above 15 are preferred to minimize methane loss and increase acid gas removal efficiency. The stage cut is determined by a combination of factors: the gas processing capacity of the third membrane separation unit (113) (the unit of membrane area required to process a unit of the feed gas) at the process pressure and temperature utilized and gas permeation/separation characteristics of the polymeric membrane deployed in the unit; the gas processing capacity of the fourth membrane separation unit (116) (the unit of membrane area required to process a unit of the feed gas) at the process pressure and temperature utilized and gas permeation/separation characteristics of the polymeric membrane deployed in the unit; the ratio of gas processing capacity between the third and fourth membrane separation units (113, 116); and the volume and the residual carbon dioxide concentration in the retentate tenth effluent stream (118) that is controlled by the valve (117). It was found, surprisingly, that the carbon dioxide concentration in the third effluent stream (106) that is treated in the third membrane separation unit (113) must be maintained above 85 carbon dioxide mole percent to minimize methane losses in the seventh effluent stream (115).

The eighth retentate effluent stream (114) is treated in the fourth membrane separation unit (116) that removes additional carbon dioxide, hydrogen sulfide, oxygen, and some fraction of nitrogen, thus forming the ninth permeate effluent stream (119) and the tenth retentate effluent stream (118). The tenth retentate effluent stream (118) is recycled to the front end of the compressor (102) to increase methane recovery. The ninth permeate effluent stream (119) is collected at substantially atmospheric pressure or a sub-atmospheric pressure and is recycled to the front end of the compressor (111) to increase methane recovery. The ninth effluent stream (119) is combined with the third effluent stream (106) and compressed in the compressor (111) to form the sixth effluent stream (112). The gas volume of the retentate tenth effluent stream (118) and its residual carbon dioxide concentration is determined by the stage cut of the fourth membrane separation unit (116), which is controlled by the valve (117).

Figure 2:
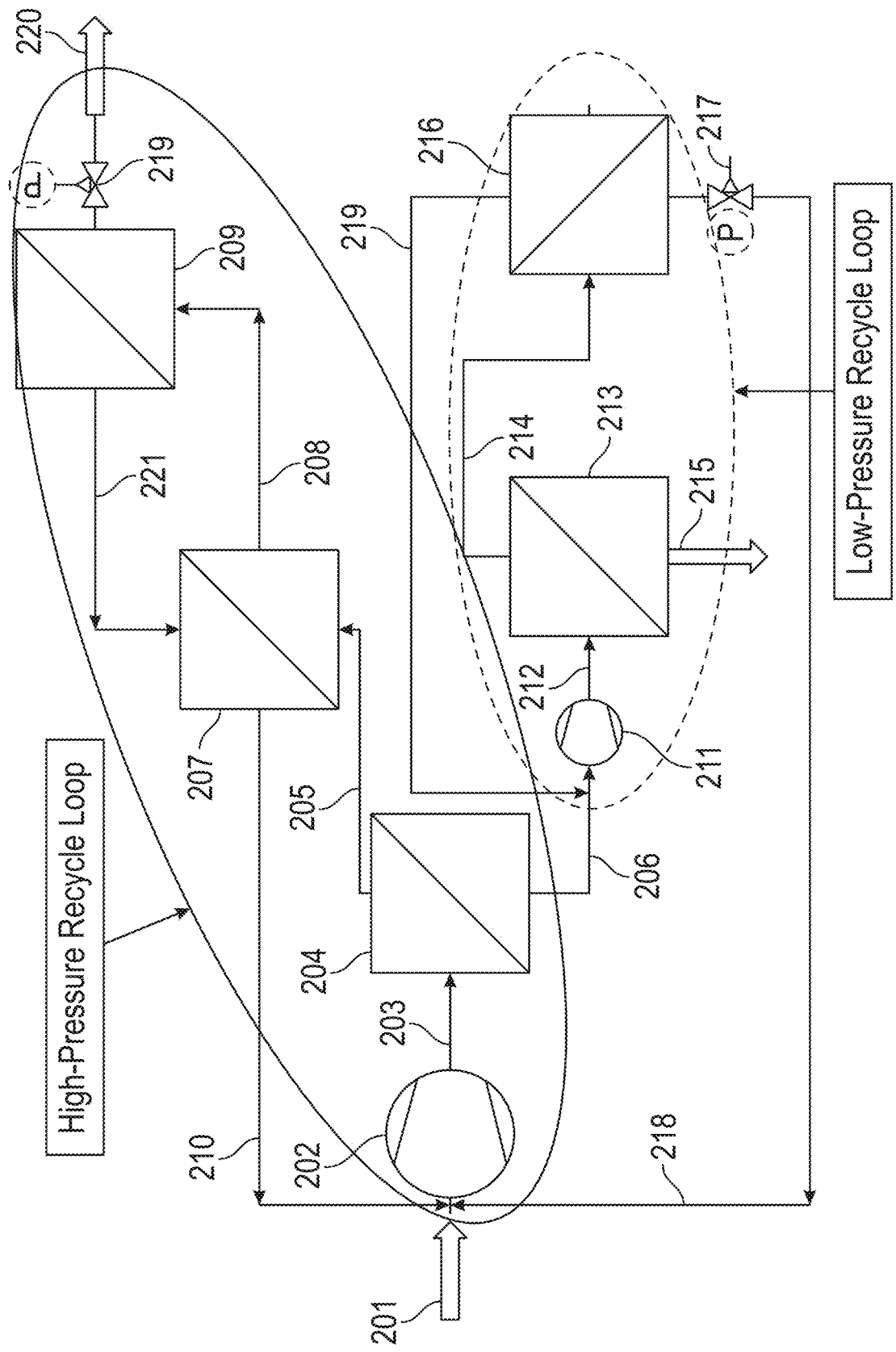
FIG. 2 is a schematic drawing of another exemplary embodiment of an apparatus according to the invention, wherein a low-pressure biogas gas containing acid gases $CO_2$ and $H_2S$, water vapor, oxygen, and nitrogen is treated in a system comprised of a high-pressure compressor, a second low-pressure compressor, and a four-stage membrane system. In this embodiment, the second membrane separation stage consists of two membrane separation modules in a sequence. The first membrane module in the sequence receives the retentate effluent stream from the first membrane separation stage and, in turn, generates a retentate stream with a reduced carbon dioxide, hydrogen sulfide, and oxygen content as compared to the feed effluent stream. The retentate stream generated by the first membrane module is treated in a second membrane module of the two-module sequence. The second membrane module generates the product RNG retentate stream, and a permeate effluent stream enriched in carbon dioxide, hydrogen sulfide, and oxygen content as compared to the gas composition fed into the second membrane module. The permeate effluent stream generated by the second membrane module is used as a sweep gas on the permeate side of the first membrane module of the two-module sequence. The combined gas stream comprised of the permeate gas stream generated by the first membrane module and the sweep stream generated by the second membrane module forms the low-pressure effluent stream that is recycled to the front end of the high-pressure compressor. The multistage membrane system features three gas recycle streams designed to increase methane recovery. The retentate gas stream generated by the fourth membrane separation stage and the permeated gas stream generated by the second membrane separation stage (comprised of two membrane modules in a sequence) are recycled to the front end of the high-pressure compressor, while the permeate gas stream from the fourth membrane separation stage is recycled to the front end of the low-pressor compressor.

In another embodiment of the method of the invention, the raw biogas containing acid gases $CO_2$ and $H_2S$, oxygen, and nitrogen is treated in a system that includes two compressors, and a multistage membrane system, as shown schematically in FIG. 2. The method is designed to treat raw biogas by removing multiple impurities and generating a high-purity RNG with residual $CO_2$ content lower than 1000 ppm, while minimizing compression energy consumption. The multistage membrane system features multiple recycle streams designed to increase methane recovery.

The embodiment is described further with reference to FIG. 2. The raw feed biogas (201) is combined with a permeate gas recycle stream (210) generated by a second membrane separation unit (207, 209) and a retentate recycled gas stream (218) generated by a fourth membrane separation unit (216) and compressed in compressor (202), followed by aftercooling and condensate separation (not shown), forming the first effluent stream (203). The first effluent stream (203) is treated in the first membrane separation unit (204) that removes a fraction of carbon dioxide, hydrogen sulfide, water vapor, oxygen, and nitrogen from the first effluent stream (203), thus forming a third permeate effluent stream (206) and the second retentate effluent stream (205), depleted in carbon dioxide, hydrogen sulfide, water vapor, oxygen, and some fraction of nitrogen as compared to the first effluent stream (203).

The second retentate effluent stream (205) is treated in the second membrane separation unit (207, 209), which is comprised of two membrane separation modules in a sequence, wherein a first membrane separation module (207) in the sequence (207, 209) receives the second effluent stream (205) and generates an eleventh retentate effluent stream (208), with a reduced carbon dioxide, hydrogen sulfide, and oxygen content as compared to the second effluent stream (205), the eleventh effluent stream (208) being treated in a second membrane separation module (209) in the two module sequence (207, 209), wherein the second membrane separation module (209) generates a fourth retentate effluent stream (220), with reduced carbon dioxide, hydrogen sulfide and oxygen content as compared to the eleventh effluent stream (208), and a permeate twelfth effluent stream (221), enriched in carbon dioxide, hydrogen sulfide and oxygen content, wherein said twelfth effluent stream (221) is used as a sweep gas on a permeate side of the first membrane separation module (207) in the sequence (207, 209) and the combined gas stream comprised of the permeate gas stream generated by the first membrane separation module (207) of the sequence (207, 209) and the twelfth effluent stream (221) used as a sweep forms the fifth effluent stream (210) recycled to the front end of the first compressor (202). The fourth retentate effluent stream (220) is collected as an RNG product. The fifth permeate effluent stream (210) is collected at atmospheric pressure or a sub-atmospheric pressure and is recycled to the front end of the compressor (202) to increase methane recovery.

The third permeate effluent stream (206) is collected at substantially atmospheric or sub-atmospheric pressure. The third effluent stream (206) is combined with the ninth permeate effluent stream (219) and the pressure of the combined streams is boosted by a compressor (211) to generate the sixth effluent stream (212) that is being treated in the third membrane separation unit (213). The third membrane separation unit (213) generates the seventh permeate effluent stream (215), comprised of carbon dioxide with a volumetric concentration above 90%, and the eighth retentate effluent stream (214), enriched in methane, oxygen, and nitrogen content. The seventh permeate effluent stream (215) is collected at a substantially atmospheric or sub-atmospheric pressure (permeate collected at a modest elevated pressure in the range of 0.5 barg is defined as substantially atmospheric). In some embodiments, the seventh effluent stream (215) is removed at a sub-atmospheric pressure above 0.2 bara by way of a vacuum pump (not shown).

The eighth effluent stream (214), containing recoverable methane, is treated in the fourth membrane separation unit (216) to generate the retentate tenth effluent stream (218), enriched in methane content, and the permeate ninth effluent stream (219), enriched in carbon dioxide content. The permeate ninth effluent stream (219) is recycled to the front end of the compressor (211) and combined with the third effluent stream (206). The combined streams are compressed in the compressor (211) to form the sixth effluent stream (212). The tenth retentate stream (218), containing recoverable methane, is recycled to the front end of the compressor (202) and combined with the raw biogas stream (201) and the fifth permeate effluent stream (210). The combined streams are compressed in the compressor (202) to form the first effluent stream (203).

The RNG product methane purity of the fourth effluent stream (220) is a function of the stage cut of the second membrane separation unit modules (207, 209), which is controlled by the valve (219). The stage cut of the second membrane separation unit (207, 209) is the ratio of combined permeate gas volumes generated by the first (207) and second (209) gas separation modules divided by the volume of the second effluent stream (205), generated by the first membrane separation unit (204). The membrane gas processing capacity of modules (207, 209) can be equal or different. It is further within the scope of the invention to equip modules (207, 209) with polymeric membranes that have different gas separation characteristics. It was found surprisingly that gas the processing capacity of the second separation module (209) is preferably smaller as compared to the gas processing capacity of the first gas separation module (207) The gas processing capacity ratio between the second (209) and first (207) modules can be below 1 to 2, preferably below 1 to 3, and most preferably 1 to 4. The residual carbon dioxide concentration in the retentate tenth effluent stream (218) generated by the fourth membrane separation unit (216) is determined by the stage cut of the fourth membrane separation unit (216), which is controlled by the valve (217).

Figure 3:
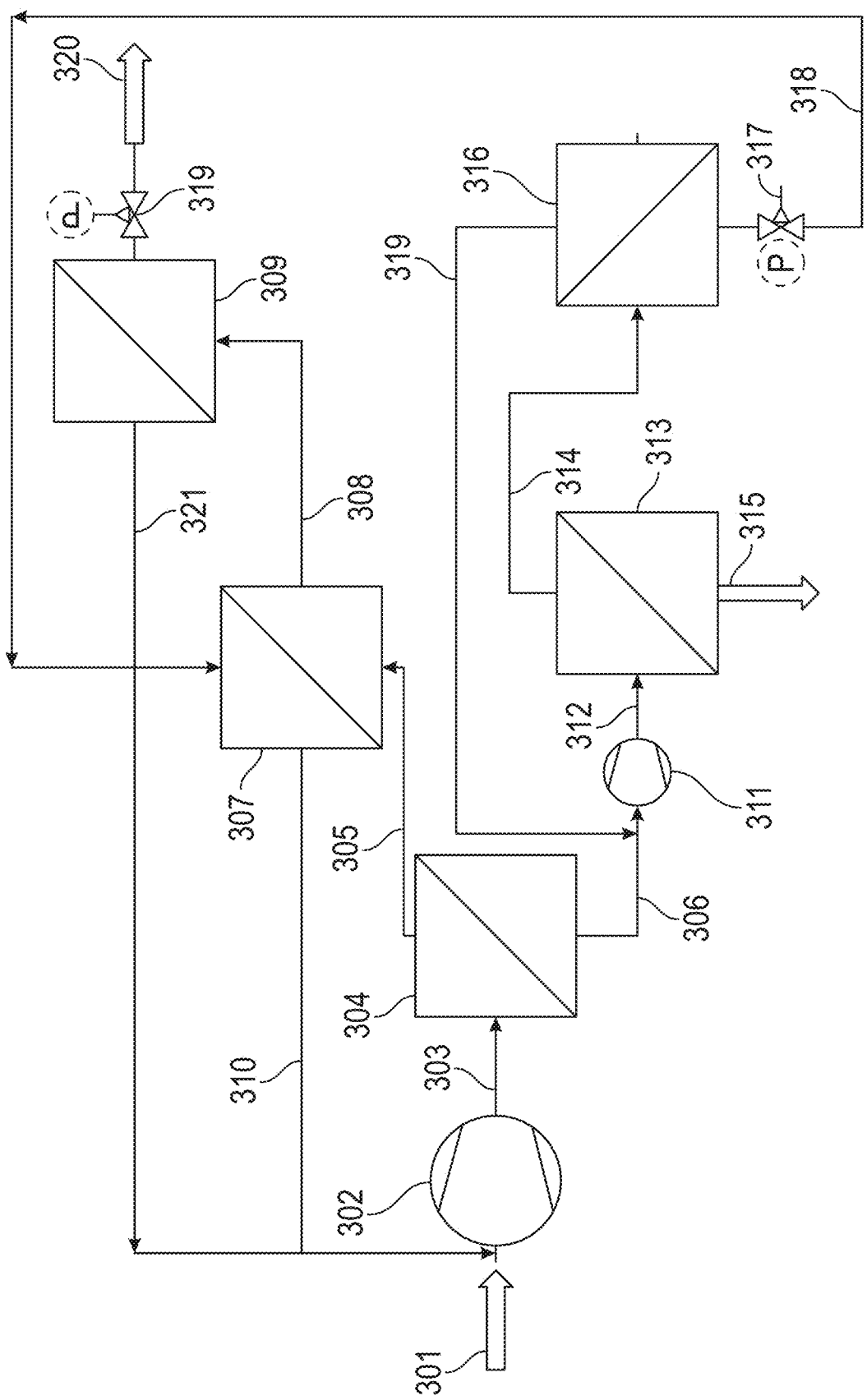
FIG. 3 is a schematic drawing of another exemplary embodiment of an apparatus according to the invention, wherein a low-pressure biogas gas containing acid gases $CO_2$ and $H_2S$, water vapor, oxygen, and nitrogen is treated in a system comprised of a high-pressure compressor, a second low-pressure compressor, and a four-stage membrane system. In this embodiment, the second membrane separation stage consists of two membrane separation modules in a sequence. The first membrane module in the sequence receives the retentate effluent stream from the first membrane separation stage and, in turn, generates a retentate stream with a reduced carbon dioxide, hydrogen sulfide, and oxygen content as compared to the feed effluent stream and a permeate gas stream enriched in carbon dioxide, hydrogen sulfide, and oxygen content as compared to retentate effluent stream generated by the first membrane separation system. The retentate stream generated by the first membrane module is treated in a second membrane module of the two-module sequence of the second membrane separation system. The second membrane module generates the product RNG retentate stream, and a permeate effluent stream enriched in carbon dioxide, hydrogen sulfide, and oxygen content as compared to the gas composition fed into the second membrane module. The permeate effluent gas streams generated by the first and second membrane modules in the sequence are recycled to the front end of the high-pressure compressor inlet. The multistage membrane system features three gas recycle streams designed to increase methane recovery. The permeated gas streams generated by the second membrane separation system (comprised of two permeate streams from two membrane modules in the sequence) and the retentate gas stream generated by the fourth membrane separation system are recycled to the front end of the high-pressure compressor, while the permeate of the fourth membrane separation system is recycled to the front end of and the low-pressor compressor.

In another embodiment of the method of the invention, the raw biogas containing acid gases $CO_2$ and $H_2S$, oxygen, and nitrogen is treated in a system that includes two compressors, and a multistage membrane system, as shown schematically in FIG. 3. The method is designed to treat raw biogas by removing multiple impurities and generating a high-purity RNG with residual $CO_2$ content lower than 2000 ppm, while minimizing compression energy consumption.

With reference to FIG. 3, the raw feed biogas (301) is combined with a fifth effluent permeate gas recycle stream (310) generated by a first module (307) of a two-module second membrane separation unit (307, 309) and an eleventh effluent permeate gas stream (321) generated by a second module (309) in the second stage membrane separation unit (307, 309). The combined stream is compressed in the compressor (302), followed by aftercooling and condensate separation (not shown) forming the first effluent stream (303). The first effluent stream (303) is treated in the first membrane separation unit (304) that removes carbon dioxide, hydrogen sulfide, water vapor, oxygen, and nitrogen, thus forming a third permeate effluent stream (306) and the second retentate effluent stream (305), depleted in carbon dioxide, hydrogen sulfide, water vapor, oxygen, and some fraction of nitrogen.

The second retentate effluent stream (305) is treated in the second membrane separation unit (307, 309), which is comprised of two membrane separation modules in a sequence, wherein the first membrane separation module (307) in the sequence (307, 309) receives the second effluent stream (305) and generates the fourth retentate effluent stream (308), with a reduced carbon dioxide, hydrogen sulfide, and oxygen content as compared to the second effluent stream (305); the fourth effluent stream (308) is treated in the second membrane separation module (309) in the sequence (307, 309), wherein the second membrane separation module (309) generates the twelfth retentate effluent stream (320), with reduced carbon dioxide, hydrogen sulfide, and oxygen content as compared to the fourth effluent stream (308), and a permeate eleventh effluent stream (321), enriched in carbon dioxide, hydrogen sulfide, and oxygen content compared to the fourth effluent stream (308), wherein the eleventh effluent stream (321) is recycled to the front end of the first compressor (302). The twelfth retentate effluent stream (320) is collected as the RNG product.

The third permeate effluent stream (306) is collected at substantially atmospheric or sub-atmospheric pressure. The third effluent stream (306) is combined with a ninth permeate effluent stream (319) and the pressure of the combined streams is boosted by a compressor (311) to generate the sixth effluent stream (312) that is being treated in the third membrane separation unit (313). The third membrane separation unit (313) generates the seventh permeate effluent stream (315), comprised of carbon dioxide with a volumetric concentration above 90%, and the eighth retentate effluent stream (314), enriched in methane, oxygen, and nitrogen content. The seventh permeate effluent stream (315) is collected at a substantially atmospheric or sub-atmospheric pressure (permeate collected at a modest elevated pressure in the range of 0.5 barg is defined as substantially atmospheric). In some embodiments, the seventh effluent stream (315) is removed at a sub-atmospheric pressure above 0.2 bara by way of a vacuum pump (not shown).

The eighth retentate effluent stream (314), containing recoverable methane, is treated in the fourth membrane separation unit (316) to generate the retentate tenth effluent stream (318), enriched in methane content, and the permeate ninth effluent stream (319), enriched in carbon dioxide content. The ninth permeate effluent stream is recycled to the front end of the compressor (311) and combined with the third effluent stream (306). The combined streams are compressed in the compressor (311) to form the sixth effluent stream (312). The tenth retentate effluent stream (318), containing recoverable methane, is used as a sweep gas on a permeate side of the first membrane separation module (307) in the sequence of modules (307, 309) in the second separation stage, and the combined streams comprised of the permeate gas stream generated by the membrane separation module (307) and the tenth effluent stream (318) generated by the fourth separation stage (316) form the fifth effluent stream (310) recycled to the front end of the first compressor (302). The fifth permeate effluent stream (310) is collected at atmospheric pressure or a sub-atmospheric pressure and is recycled to the front end of the compressor (302) to increase methane recovery.

The RNG product methane purity of the twelfth retentate effluent stream (320) is a function of the stage cut of the second membrane separation unit modules (307, 309), which is controlled by the valve (319). The stage cut of the second membrane separation unit (307, 309) is the ratio of combined permeate gas volumes generated by the first (307) and second (309) gas separation modules divided by the volume of the second effluent stream (305), generated by the first membrane separation unit (304). The membrane gas processing capacity of modules (307, 309) can be equal or different. The residual carbon dioxide concentration in the retentate tenth effluent stream (318) generated by the fourth membrane separation unit (316) is determined by the stage cut of the fourth membrane separation unit (316), which is controlled by the valve (317).

The purification of raw biogas by the method of the instant invention is compared to biogas purification by the prior art 3-stage system. The performance of four process design configurations was calculated, and the results are listed in Table 1. The process schematics of the designs are shown in FIGS. 1, 2, 3, and 4, the latter is the prior art design with a single compressor. The performance was calculated using identical input design parameters for all cases. Composition of the inlet biogas in mole fractions: Methane 0.5375; $CO_2$ 0.43; Nitrogen 0.015; Oxygen 0.005; $H_2O$ 0.01; $H_2S$ 0.0025. The feed gas compressor pressure—14 barg. The compressed gas is cooled to +5° C. followed by condensate separation and reheating to +20° C. before the gas is introduced into the first membrane separation stage. The temperature of recycled gas streams before gas streams were combined was +25° C. The temperature of combined gas recycle streams was maintained at +25° C. The gas is compressed by the second low-pressure compressor to 3.5 barg, T=25° C. The processes were modeled by setting $CO_2$ gas concentration in the retentate of the first membrane stage at 10% mole. This concentration was found to be in the optimal range for the generation of a high-purity RNG product. The inlet biogas pressure was 0.1 barg and the temperature was +25° C. The biogas pressure directed into the 1st membrane separation stage was at 13.4 barg at a temperature of +20° C. Identical parameters are used to model the four process configurations and the membrane separation characteristics deployed in membrane separation stages were optimized to reduce installed membrane processing cost. The four design cases were modeled using membranes with identical properties in respective stages to generate comparable results. High selectivity membranes were used in the 1st and 3rd membrane separation stages and high gas processing capacity membranes with a lower selectivity were used for the other stages to reduce the required membrane installation cost without significant separation efficiency reduction. The following membrane properties were used in process modeling:

Gas selectivity $CO_2/CH_4$ of 50 for stages 1 and 3, and $CO_2/CH_4$ selectivity of 21 for all other stages; $CO_2$ permeance of 0.01375 $Nm^3/(h*bar*ft^2)$ for stages 1 and 3, and $CO_2$ permeance of 0.023058 $Nm^3/(h*bar*ft^2)$ for other stages;

Gas selectivity $H_2S/CH_4$ of 12 for stages 1 and 3, and $H_2S/CH_4$ selectivity of 9 for all other stages; $H_2S$ permeance of 0.0033 $Nm^3/(h*bar*ft^2)$ for stages 1 and 3, and $H_2S$ permeance of 0.009882 $Nm^3/(h*bar*ft^2)$ for other stages;

Gas selectivity $O_2/CH_4$ of 14 for stages 1 and 3, and $Oz/CH_4$ selectivity 10 for all other stages, $O_2$ permeance of 0.00385 $Nm^3/(h*bar*ft^2)$ for stages 1 and 3, and $O_2$ permeance of 0.01098 $Nm^3/(h*bar*ft^2)$ for other stages;

Gas selectivity $N_2/CH_4$ for stages 1 and 3, and $N_2/CH_4$ selectivity of 2.8 for all other stages; Na permeance of 0.00055 $Nm^3/(h*bar*ft^2)$ for stages 1 and 3, and $N_2$ permeance of 0.003075 $Nm^3/(h*bar*ft^2)$ for other stages; and Gas selectivity $H_2O/CH_4$ of 150 for stages 1 and 3, and $H_2O/CH_4$ selectivity of 70 for all other stages; $H_2O$ permeance of 0.04125 $Nm^3/(h*bar*ft^2)$ for stages 1 and 3, and $H_2O$ permeance of 0.07685 $Nm^3/(h*bar*ft^2)$ for other stages.

In all cases, the process was modeled to attain 99.5% methane recovery with carbon dioxide product purity at 0.1 or 0.05% mole.

TABLE 1

| Table 1 No | Parameter | 3-stage 1 compressor (prior art, FIG. 4) Var. 1 | 3-stage 1 compressor (prior art, FIG. 4) Var. 2 | 4-stage 2 compressors FIG. 1 Var.1 | 4-stage 2 compressors FIG. 1 Var.2 |
|---|---|---|---|---|---|
| 1. | Biomethane target $CO_2$, % mole | 0.1 | 0.1 | 0.1 | 0.1 |
| 2. | $CO_2$ content after stage 1, % mole | 16.0* | 10.0 | 10.0 | 10.0 |
| 3. | Stage cut %, stage 1 | 49.58 | 53.41 | 35.23 | 36.17 |
| 4. | Stage cut %, stage 2 | 38.42 | 37.53 | 38.64 | 38.28 |
| 5. | Stage cut %, stage 3 | 52.0 | 43.5 | 74.0 | 79.0 |
| 6. | Stage cut %, stage 4 | | | 69.5 | 25.0 |
| 7 | S stage 1, $ft^2/(Nm^3/h)$ | 44.72 | 69.18 | 15.39 | 19.88 |
| 8. | S stage 2, $ft^2/(Nm^3/h)$ | 20.13 | 22.95 | 19.83 | 21.83 |
| 9. | S stage 3, $ft^2/(Nm^3/h)$ | 28.57 | 20.60 | 14.19 | 15.32 |
| 10. | S stage 4, $ft^2/(Nm^3/h)$ | | | 5.899 | 2.013 |
| 11. | Biogas utilization square, $ft^2/(Nm^3/h)$ | 93.41 | 112.73 | 55.31 | 59.04 |
| 12. | W compressor 1, kW | 298 | 318 | 235 | 241 |

TABLE 1-continued

| Table 1 No | Parameter | 3-stage 1 compressor (prior art, FIG. 4) Var. 1 | 3-stage 1 compressor (prior art, FIG. 4) Var. 2 | 4-stage 2 compressors FIG. 1 Var.1 | 4-stage 2 compressors FIG. 1 Var.2 |
|---|---|---|---|---|---|
| 13. | W compressor 2, kW | | | 45 | 33 |
| 14. | Biogas utilization power, kW/Nm³ | 0.298 | 0.318 | 0.28 | 0.274 |
| 15. | Biomethane $CH_4$, % mol. | 97.07 | 97.06 | 97.16 | 97.11 |
| 16. | Biomethane $N_2$, % mol. | 2.63 | 2.63 | 2.6 | 2.62 |
| 17. | Biomethane $O_2$, % mol. | 0.1114 | 0.1176 | 0.0805 | 0.0962 |
| 18. | Biomethane $H_2S$, % mol. | 0.0856 | 0.0918 | 0.0619 | 0.0750 |

*CO2 concentration reduction from the gas composition to the retentate gas composition in the membrane separation unit 2 is 100 times or more and requires membranes of exceptionally high-quality The two comparative examples of biogas purification by a 3-stage, 1 compressor system (with reference to FIG. 4) are shown in Table 1 (columns 1 and 2, Variants 1 and 2). The Variants 1 and 2 differ in the carbon dioxide concentration of the feed gas directed into the second membrane separation unit. A higher $CO_2$ feed gas concentration of 16% as compared to the 10% concentration provides for a better performance. However, the higher feed gas concentration demands a much higher $CO_2$ concentration ratio reduction in one step in the second membrane separation unit (as high as 160 times). Commercial membrane modules frequently contain defects and deviate for an ideal counter-current gas separation operation. This may preclude the attainment of a high-purity product and deviation from ideal membrane performance modeling.

The two comparative examples of biogas purification by a 4-stage, 2 compressor system (with reference to FIG. 1) as shown in Table 1 (columns 3 and 4, Variants 1 and 2). The Variants 1 and 2 differ in the distribution of stage cuts between membrane separation units three and four. Changes in stage cut distribution can be used to minimize energy consumption with some increase in membrane gas processing area or to lower membrane gas processing area with some increase in energy consumption.

The data presented in Table 2, columns 1 and 2 summarize biogas purification by the method of the invention with reference to FIG. 2. The process design configuration that is summarized in columns 1 and 2 (variants 1 and 2) differs in the ratio of the membrane area of the membrane separation stage 2, module 1 (207) and membrane separation stage 2, module 2 (209). The ratio is 75/25 for the listed Var. 1 and 50/50 for the listed Var. 2. Thus, the corresponding membrane gas processing capacity between the first and second membrane modules in the second membrane separation stage differs. The 75/25 membrane area ratio provides for improved performance.

The data presented in Table 2 columns 3 and 4 summarize biogas purification by the method of the invention with reference to FIG. 3. The process design configuration that is summarized in columns 3 and 4 (variants 1 and 2) differs in a number of design aspects—in the $CO_2$ concentration of the feed gas directed into the second membrane separation unit and the distribution of stage cuts between the third and fourth membrane separation units. Thus, the optimization of multiple design parameters can be advantageously utilized to further optimize the desired tradeoffs between preferred economic outcomes.

TABLE 2

| Table 1 No | Parameter | 4-stage 2 compressors FIG. 2 Var. 1 | 4-stage 2 compressors FIG. 2 Var. 2 | 4-stage 2 compressors FIG. 3 Var.1 | 4-stage 2 compressors FIG. 3 Var.2 |
|---|---|---|---|---|---|
| 1. | Biomethane target $CO_2$, % mole | 0.005 | 0.005 | 0.005 | 0.005 |
| 2. | $CO_2$ content after stage 1, % mole | 10.0 | 10.0 | 10.0 | 16.0 |
| 3. | Stage cut %, stage 1 | 36.64 | 33.86 | 33.83 | 28.7 |
| 4. | Stage cut %, stage 2.1 | 39.0 | 32.0 | 13.0 | 10.3 |
| 5. | Stage cut %, stage 2.2 | 13.32 | 26.9 | 43.56 | 48.21 |
| 6. | Stage cut %, stage 3 | 75.0 | 73.0 | 72.0 | 80 |
| 7. | Stage cut %, stage 4 | 25.7 | 24.0 | 24.0 | 69.5 |
| 8. | S stage 1, ft²/(Nm³/h) | 21.74 | 22.64 | 22.89 | 13.83 |
| 9. | S stage 2.1, ft²/(Nm³/h) | 25.42 | 19.94 | 6.597 | 9.388 |
| 10. | S stage 2.2, ft²/(Nm³/h) | 8.358 | 19.67 | 33.32 | 36.13 |
| 11. | S stage 3, ft²/(Nm³/h) | 15.21 | 15.10 | 14.99 | 16.00 |
| 12. | S stage 4, ft²/(Nm³/h) | 2.265 | 2.220 | 2.255 | 10.05 |
| 13. | Biogas utilization square, ft²/(Nm³/h) | 72.99 | 79.57 | 80.05 | 85.40 |
| 14. | W compressor 1, kW | 269 | 283 | 285 | 280 |
| 15. | W compressor 2, kW | 35 | 36 | 36 | 33 |
| 16. | Biogas utilization power, kW/Nm³ | 0.304 | 0.319 | 0.322 | 0.313 |
| 17. | Biomethane $CH_4$, % mol. | 97.32 | 97.35 | 97.36 | 97.40 |
| 18. | Biomethane $N_2$, % mol. | 2.61 | 2.6 | 2.6 | 2.55 |
| 19. | Biomethane $O_2$, % mol. | 0.0370 | 0.0278 | 0.0248 | 0.0252 |
| 20. | Biomethane $H_2S$, % mol. | 0.0317 | 0.0203 | 0.0131 | 0.0210 |

The method of the instant invention is advantageous as compared to the prior art three-stage system. The gas processing membrane capacity (biogas utilization, i.e. the required membrane surface area per unit gas product volume generated) is reduced, and the compression energy consumption (KW, amount of energy required to generate the unit volume of product) is decreased to generate the product of identical purity with 99.5% recovery. The prior art 3-stage system required a much larger membrane surface area and consumed more power to generate an identical product. The four-stage system of the instant invention afforded improved levels of other impurities reduction ($O_2$, $H_2S$, and $N_2$) in addition to carbon dioxide removal.

The present invention is described with reference to Figures and a number of embodiments, which should not be construed as limiting the present invention.

The invention claimed is:

1. A method of generating a high-purity hydrocarbon stream from a raw biogas feed stream comprised of methane, carbon dioxide, nitrogen, oxygen, water vapor and hydrogen sulfide available at a substantially atmospheric pressure, said method comprising the steps of:
    (i) compressing said raw biogas feed gas stream mixed with a first recycled permeate gas stream and a recycled retentate gas stream in a first compressor to a pressure from 6 to 25 barg, thereby forming a first effluent stream;
    (ii) passing the first effluent stream into a first membrane separation unit, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream, said permeate third effluent stream being removed at substantially atmospheric pressure or a sub-atmospheric pressure;
    (iii) passing the retentate second effluent stream to a second membrane separation unit, wherein the second membrane separation unit removes a portion of carbon dioxide, hydrogen sulfide, and oxygen from the retentate second effluent stream, thereby forming a retentate fourth effluent stream having a lower carbon dioxide, hydrogen sulfide, and oxygen content as compared to the retentate second effluent stream and a permeate fifth effluent stream enriched in carbon dioxide, hydrogen sulfide and oxygen content as compared to the retentate second effluent stream;
    (iv) compressing said permeate third effluent stream mixed with a second recycled permeate gas stream in a second compressor to a pressure from 2 to 6 barg, thus forming a sixth effluent stream;
    (v) passing the sixth effluent stream to a third membrane separation unit, wherein the third membrane separation unit removes a portion of carbon dioxide, hydrogen sulfide, water vapor, and oxygen from the sixth effluent stream, thereby forming a retentate eighth effluent stream having a lower carbon dioxide, hydrogen sulfide, and water vapor content as compared to the sixth effluent stream and a higher oxygen content as compared to the raw biogas feed stream and a permeate seventh effluent stream with a carbon dioxide concentration above 95 volumetric percent, wherein the permeate seventh effluent stream is at substantially atmospheric pressure or a sub-atmospheric pressure;
    (vi) passing the retentate eighth effluent stream to a fourth membrane separation unit, wherein the fourth membrane separation unit removes a portion of carbon dioxide, hydrogen sulfide, water vapor, and oxygen from the retentate eighth effluent stream, thereby forming a retentate tenth effluent stream having a lower carbon dioxide, hydrogen sulfide, and water vapor content as compared to the retentate eighth effluent stream and a permeate ninth effluent stream with increased carbon dioxide content as compared to the retentate eighth effluent stream, said permeate ninth effluent stream being removed at substantially atmospheric pressure or a sub-atmospheric pressure;
    (vii) passing said permeate fifth effluent stream to a front end of the first compressor, wherein the permeate fifth effluent stream defines the first recycled permeate gas stream that is mixed with said raw biogas feed gas stream in step (i);
    (viii) passing said permeate ninth effluent stream to a front end of the second compressor, wherein the permeate ninth effluent stream defines the second recycled permeate gas stream that is mixed with said permeate third effluent stream in step (iv);
    (ix) passing said retentate tenth effluent stream to a front end of the first compressor, wherein the retentate tenth effluent stream defines the recycled retentate gas stream that is mixed with said raw biogas feed gas stream in step (i); and
    (x) collecting the retentate fourth effluent stream generated by the second membrane separation unit as a high-purity hydrocarbon product, wherein the retentate fourth effluent stream has an increased methane content and reduced hydrogen sulfide, oxygen, and carbon dioxide content as compared to the raw biogas feed gas stream.

2. The method of claim 1 further comprising the step of collecting the permeate seventh effluent stream generated by the third membrane separation unit as a product.

3. The method of claim 1 wherein the retentate fourth effluent stream is treated in an adsorption unit to remove additional hydrogen sulfide.

4. The process of claim 3 wherein an adsorbent in the adsorption unit comprises an activated carbon.

5. The method of claim 1 wherein the first, second, third and fourth membrane separation units are equipped with semipermeable polymeric hollow fiber membranes exhibiting a $CO_2/CH_4$ gas separation factor above 20, a hydrogen sulfide/methane separation factor above 9 and an oxygen/methane separation factor above 5.

6. The method of claim 5 wherein the first, second, third, and fourth membrane separation units are equipped with semipermeable polymeric hollow fiber membranes exhibiting a $CO_2/CH_4$ gas separation factor above 35, a hydrogen sulfide/methane separation factor above 15 and an oxygen/methane separation factor above 6.

7. The method of claim 6 wherein the first, second, third, and fourth membrane separation units are equipped with semipermeable polymeric hollow fiber membranes exhibiting a $CO_2/CH_4$ gas separation factor above 40, a hydrogen sulfide/methane separation factor above 20, and an oxygen/methane separation factor above 7.

8. The method of claim 1 wherein at least one of the first, second, third, and fourth membrane separation units is equipped with semipermeable polymeric hollow fiber membranes that differ in gas separation characteristics as compared to membranes equipped in others of the first, second, third and fourth membrane separation units.

9. The method of claim 1 wherein the retentate second effluent stream is treated in a deoxygenation unit followed by aftercooling and condensate separation.

10. The method of claim 1 wherein the retentate fourth effluent stream is treated in a deoxygenation unit followed by aftercooling, condensate separation and dehydration.

11. The method of claim 1 wherein a vacuum pump is disposed on the permeate seventh effluent stream to collect the permeate seventh effluent stream at a sub-atmospheric pressure.

12. The method of claim 1 wherein the retentate fourth effluent stream is treated in a nitrogen rejection unit.

13. The method of claim 1 wherein the raw biogas feed stream or the first effluent stream or both are treated to remove Volatile Organic Compounds (VOCs) and to reduce water vapor content upstream of the first membrane separation unit.

14. The method of claim 1 wherein the permeate third effluent stream and the second recycled permeate gas stream are compressed by the second compressor in step (iv) to a pressure from 3 to 4 barg.

15. The method of claim 1 wherein the permeate seventh effluent stream is treated to remove hydrogen sulfide.

16. The method of claim 15 wherein the hydrogen sulfide is removed in a biological hydrogen sulfide removal unit.

17. The method of claim 1 further comprising an adsorption unit that removes contaminants from the retentate fourth effluent stream.

18. The method of claim 1 wherein the second membrane separation unit consists of two membrane separation modules in a sequence, wherein a first membrane separation module in the sequence receives the retentate second effluent stream and generates a retentate eleventh effluent stream with a reduced carbon dioxide, hydrogen sulfide, and oxygen content as compared to the retentate second effluent stream, the retentate eleventh effluent stream being treated in a second membrane separation module in the sequence, wherein said second membrane separation module generates the retentate fourth effluent stream with reduced carbon dioxide, hydrogen sulfide and oxygen content as compared to the retentate eleventh effluent stream, and a permeate twelfth effluent stream enriched in carbon dioxide, hydrogen sulfide and oxygen content, wherein said permeate twelfth effluent stream is used as a sweep gas on a permeate side of the first membrane separation module in the sequence and a combined permeate gas stream generated by the first membrane separation module and the permeate twelfth effluent stream generated by the second membrane separation module form the permeate fifth effluent stream recycled to the front end of the first compressor wherein said permeate fifth effluent stream defines the first recycled permeate gas stream that is mixed with said raw biogas feed gas stream in step (i).

19. The method of claim 1 wherein the first compressor compresses said raw biogas feed gas stream, the first recycled permeate gas stream, and the recycled retentate gas stream to a pressure from 10 to 16 barg, followed by aftercooling and condensate separation, thereby forming the first effluent stream.

20. The method of claim 19 wherein the permeate third effluent stream and the second recycled permeate gas stream are compressed by the second compressor to a pressure from 3 to 4 barg.

21. The method of claim 20 wherein the retentate fourth effluent stream has a carbon dioxide concentration below 0.1% mole, wherein the retentate second effluent stream has a carbon dioxide concentration between 20 and 8% mole, and an overall methane recovery by the method is above 95%.

22. The method of claim 20 wherein the retentate second effluent stream has a carbon dioxide concentration between 12 and 8% mole.

23. The method of claim 21 wherein the retentate fourth effluent stream has a carbon dioxide concentration below 500 ppm, and an overall methane recovery by the method is above 99%.

24. The method of claim 23 wherein the retentate fourth effluent stream has a carbon dioxide concentration below 50 ppm, and the overall methane recovery by the method is above 99.5%.

25. An apparatus for the purification of a raw biogas stream comprised of methane, carbon dioxide, oxygen, water vapor, nitrogen, and hydrogen sulfide available at a substantially atmospheric pressure, said apparatus comprising:

(i) a first compressor that compresses a combined feed gas stream comprised of the raw biogas stream, a first recycled permeate gas stream, and a recycled retentate gas stream to a pressure from 6 to 25 barg, thereby forming a first effluent stream;

(ii) a first membrane separation unit that receives the first effluent stream, the first membrane separation unit comprising a first membrane that removes a portion of carbon dioxide, oxygen, hydrogen sulfide, water vapor, and nitrogen from the first effluent stream, thereby forming a retentate second effluent stream having a lower carbon dioxide content as compared to the first effluent stream and a permeate third effluent stream enriched in carbon dioxide, hydrogen sulfide, water vapor and oxygen as compared to the first effluent stream;

(iii) a second membrane separation unit that receives the retentate second effluent stream, the second membrane separation unit comprising a second membrane that removes a portion of carbon dioxide, hydrogen sulfide and oxygen from the second effluent stream, thereby forming a retentate fourth effluent stream having a lower carbon dioxide, hydrogen sulfide and oxygen content as compared to the retentate second effluent stream and a permeate fifth effluent stream enriched in carbon dioxide, hydrogen sulfide and oxygen content as compared to the retentate second effluent stream;

(iv) a second compressor compressing a combined gas stream comprised of the permeate third effluent stream and a second recycled permeate stream to a pressure from 2 to 6 barg, thus forming a sixth effluent stream;

(v) a third membrane separation unit that receives the sixth effluent stream, the third membrane separation unit comprising a third membrane that removes a portion of carbon dioxide, hydrogen sulfide, water vapor and oxygen from the sixth effluent stream, thereby forming a retentate eighth effluent stream having a lower carbon dioxide, hydrogen sulfide, and water vapor content as compared to the sixth effluent stream and a higher oxygen content as compared to the sixth effluent stream and a permeate seventh effluent stream enriched in carbon dioxide content and depleted in oxygen and methane content as compared to the sixth effluent stream, wherein the permeate seventh effluent stream is at substantially atmospheric pressure or at a sub-atmospheric pressure;

(vi) a fourth membrane separation unit that receives the retentate eighth effluent stream, the fourth membrane separation unit comprising a fourth membrane that removes a portion of carbon dioxide, hydrogen sulfide, water vapor and oxygen from the retentate eighth effluent stream, thereby forming a retentate tenth effluent stream having a lower carbon dioxide, hydrogen sulfide, and water vapor content as compared to the retentate eighth effluent stream and a permeate ninth effluent stream enriched in carbon dioxide content and depleted in methane content as compared to the retentate eighth effluent stream, wherein the permeate ninth effluent stream is at substantially atmospheric pressure or at a sub-atmospheric pressure;

(vii) wherein the permeate fifth effluent stream, containing recoverable methane, defines the first recycled permeate gas stream combined with the raw biogas stream in (i);

(viii) wherein the permeate ninth effluent stream defines the second recycled permeate gas stream combined with the permeate third effluent stream in (iv);

(ix) wherein the retentate tenth effluent stream defines the recycled retentate gas stream combined with the raw biogas feed stream in (i); and (x) wherein the retentate fourth effluent stream generated by the second membrane separation unit is collected as a methane product, wherein the retentate fourth effluent stream has a reduced hydrogen sulfide, oxygen, and carbon dioxide content as compared to the raw biogas stream.

26. The apparatus of claim 25 further comprising an adsorption unit that removes a remaining hydrogen sulfide from the retentate fourth effluent stream.

27. The apparatus of claim 25 further comprising an adsorption unit that removes contaminants from the first effluent stream prior to the first effluent stream being treated in the first membrane separation unit.

28. The apparatus of claim 25 further comprising a deoxygenation unit followed by aftercooling, condensate removal units and a dehydration unit that removes oxygen from the retentate fourth effluent stream.

29. The apparatus of claim 25 further comprising a deoxygenation unit followed by aftercooling and condensate removal units that remove oxygen from the retentate second effluent stream.

30. The apparatus of claim 25 wherein the first, second, third, and fourth membranes in the first, second, third and fourth membrane separation units are polymeric membranes with a carbon dioxide/methane separation factor above 25, a hydrogen sulfide/methane separation factor above 9, and an oxygen/nitrogen gas separation factor of above 5.

31. The apparatus of claim 30 wherein the first, second, third, and fourth membranes in the first, second, third, and fourth membrane separation units are polymeric membranes with a carbon dioxide/methane separation factor above 35, a hydrogen sulfide/methane separation factor above 15 and an oxygen/nitrogen gas separation factor of above 6.

32. The apparatus of claim 25 wherein the second membrane separation unit consists of two membrane separation modules in a sequence, wherein a first membrane separation module in the sequence receives the retentate second effluent stream and generates a retentate eleventh effluent stream with a reduced carbon dioxide, hydrogen sulfide, and oxygen content as compared to the retentate second effluent stream, the retentate eleventh effluent stream being treated in a second membrane separation module in the sequence comprising the second membrane separation unit, wherein the said second membrane separation module generates the retentate fourth effluent stream with reduced carbon dioxide, hydrogen sulfide and oxygen content as compared to the retentate eleventh effluent stream, and a permeate twelfth effluent stream enriched in carbon dioxide, hydrogen sulfide and oxygen content, wherein said permeate twelfth effluent stream is used as a sweep gas on a permeate side of the first membrane separation module in the sequence and a combined gas stream comprised of a permeate gas stream generated by the first membrane separation module and the permeate twelfth effluent stream generated by the second membrane module form the permeate fifth effluent stream recycled to the front end of the first compressor wherein said permeate fifth effluent stream defines the first recycled permeate gas stream that is mixed with said raw biogas stream in step (i).

33. The apparatus of claim 25 wherein the permeate third effluent stream and the second recycled permeate stream generated by the fourth membrane separation unit are compressed by the second compressor in step (iv) to a pressure from 3 to 4 barg.

34. The apparatus of claim 25 wherein the permeate seventh effluent stream has a carbon dioxide concentration above 90 mole percent.

35. The apparatus of claim 34 wherein the permeate seventh effluent stream has a carbon dioxide concentration above 95 mole percent.

36. The apparatus of claim 35 wherein the permeate seventh effluent stream has a carbon dioxide concentration above 98 mole percent.

37. The apparatus of claim 25 wherein the first compressor compresses the combined feed gas stream comprised of the raw biogas stream, the first recycled permeate gas stream, and the recycled retentate gas stream to a pressure from 10 to 16 barg, followed by aftercooling and condensate separation, thereby forming the first effluent stream.

38. The apparatus of claim 37 wherein the permeate third effluent stream and the second recycled permeate stream are compressed by the second compressor to a pressure from 3 to 4 barg.

39. The apparatus of claim 38 wherein the retentate fourth effluent stream has a carbon dioxide concentration below 0.1% mole, wherein the retentate second effluent stream has a carbon dioxide concentration between 20 and 8% mole, and an overall methane recovery by the apparatus is above 95%.

40. The apparatus of claim 39 wherein the retentate second effluent stream has a carbon dioxide concentration between 12 and 8% mole.

41. The apparatus of claim 39 wherein the retentate fourth effluent stream has a carbon dioxide concentration below 500 ppm, and an overall methane recovery by the apparatus is above 99%.

42. The apparatus of claim 41 wherein the retentate fourth effluent stream has a carbon dioxide concentration below 50 ppm, and the overall methane recovery by the apparatus is above 99.5%.

43. A method of generating a high-purity hydrocarbon stream from a raw biogas feed stream comprised of methane, carbon dioxide, nitrogen, oxygen, water vapor and hydrogen sulfide available at a substantially atmospheric pressure, said method comprising the steps of:

(i) compressing said raw biogas feed gas stream mixed with a first recycled permeate gas stream and a second recycled permeate gas stream in a first compressor to a pressure from 6 to 25 barg, thereby forming a first effluent stream;

(ii) passing the first effluent stream into a first membrane separation unit, wherein the first membrane separation unit removes a portion of oxygen, hydrogen sulfide, water vapor, and carbon dioxide from the first effluent stream, thereby forming a retentate second effluent stream having a reduced content of carbon dioxide, hydrogen sulfide, oxygen, and water vapor as compared to the first effluent stream and a permeate third effluent stream enriched in oxygen, water vapor, hydrogen sulfide, and carbon dioxide as compared to the first effluent stream, said permeate third effluent stream being removed at substantially atmospheric pressure or a sub-atmospheric pressure;

(iii) passing the retentate second effluent stream to a second membrane separation unit, wherein the second membrane separation unit removes a portion of carbon dioxide, hydrogen sulfide, and oxygen from the retentate second effluent stream, thereby forming a retentate fourth effluent stream having a lower carbon dioxide, hydrogen sulfide, and oxygen content as compared to the retentate second effluent stream and a permeate fifth effluent stream enriched in carbon dioxide, hydrogen sulfide and oxygen content as compared to the retentate second effluent stream;

(iv) compressing said permeate third effluent stream mixed with a third recycled permeate gas stream in a second compressor to a pressure from 2 to 6 barg, thus forming a sixth effluent stream;

(v) passing the sixth effluent stream to a third membrane separation unit wherein the third membrane separation unit removes a portion of carbon dioxide, hydrogen sulfide, water vapor, and oxygen from the sixth effluent stream, thereby forming a retentate eighth effluent stream having a lower carbon dioxide, hydrogen sulfide, and water vapor content as compared to the sixth effluent stream and a higher oxygen content as compared to the raw biogas feed stream and a permeate seventh effluent stream with a carbon dioxide concentration above 95 volumetric percent, wherein the permeate seventh effluent stream is at substantially atmospheric pressure or a sub-atmospheric pressure;

(vi) passing the retentate eighth effluent stream to a fourth membrane separation unit wherein the fourth membrane separation unit removes a portion of carbon dioxide, hydrogen sulfide, water vapor, and oxygen from the retentate eighth effluent stream, thereby forming a retentate tenth effluent stream having a lower carbon dioxide, hydrogen sulfide, and water vapor content as compared to the retentate eighth effluent stream and a permeate ninth effluent stream with increased carbon dioxide content as compared to the retentate eighth effluent stream, said permeate ninth effluent stream being removed at substantially atmospheric pressure or a sub-atmospheric pressure;

(vii) passing said permeate ninth effluent stream to a front end of the second compressor, wherein the permeate ninth effluent stream defines the third recycled permeate gas stream that is mixed with said permeate third effluent stream in step (iv);

(viii) passing the retentate fourth effluent stream to a fifth membrane separation unit wherein the fifth membrane separation unit removes a portion of carbon dioxide, hydrogen sulfide, water vapor, and oxygen from the retentate fourth effluent stream, thereby forming a retentate twelfth effluent stream having a lower carbon dioxide, hydrogen sulfide, oxygen and water vapor content as compared to the retentate fourth effluent stream and a permeate eleventh effluent stream having a higher carbon dioxide, hydrogen sulfide, water vapor and oxygen content as compared to the retentate fourth effluent stream, wherein the permeate eleventh effluent stream is at substantially atmospheric pressure or a sub-atmospheric pressure;

(ix) passing said permeate eleventh effluent stream to a front end of the first compressor, wherein the permeate eleventh effluent stream defines the second recycled permeate gas stream that is mixed with said raw biogas feed gas stream in step (i);

(x) passing said retentate tenth effluent stream to a permeation side of the second membrane separation unit to act as a sweep gas, wherein the retentate tenth effluent stream combined with the permeate fifth effluent stream generated by the second membrane separation unit defines the first recycled permeate gas stream that is mixed with said raw biogas feed gas stream in step (i); and (xi) collecting the retentate twelfth effluent stream generated by the fifth membrane separation unit as a high-purity hydrocarbon product, wherein the retentate twelfth effluent stream has an increased methane content and reduced hydrogen sulfide, oxygen, and carbon dioxide content as compared to the raw biogas feed stream.

* * * * *